US009010672B2

(12) United States Patent
Bedak et al.

(10) Patent No.: US 9,010,672 B2
(45) Date of Patent: Apr. 21, 2015

(54) BELT RETRACTOR

(75) Inventors: Nizam Bedak, Schwaebisch Gmuend (DE); Oliver Gross, Schwaebisch Gmuend (DE); Joachim Biller, Lorch (DE); Bernd Gentner, Ellwangon (DE); Andreas Henning, Munich (DE)

(73) Assignee: TRW Automotive GmbH, Alfdorf (DE)

( * ) Notice: Subject to any disclaimer, the term of this patent is extended or adjusted under 35 U.S.C. 154(b) by 540 days.

(21) Appl. No.: 11/981,174

(22) Filed: Oct. 31, 2007

(65) Prior Publication Data

US 2008/0116310 A1 May 22, 2008

(30) Foreign Application Priority Data

Nov. 2, 2006 (DE) .................. 10 2006 051 670
Jun. 5, 2007 (DE) .................. 10 2007 026 128

(51) Int. Cl.
*B60R 22/38* (2006.01)
*B60R 22/34* (2006.01)
*B60R 22/28* (2006.01)

(52) U.S. Cl.
CPC ....... *B60R 22/3413* (2013.01); *B60R 2022/283* (2013.01); *B60R 2022/288* (2013.01)

(58) Field of Classification Search
CPC .............. B60R 22/341; B60R 22/3413; B60R 22/4676
USPC ......... 242/379.1, 383.1, 384.1; 280/805, 807; 297/470–472, 475–478
See application file for complete search history.

(56) References Cited

U.S. PATENT DOCUMENTS

| 2,701,693 | A | * | 2/1955 | Nordmark et al. | ......... | 242/384.3 |
| 5,558,295 | A | * | 9/1996 | Bauer | ......... | 242/379.1 |
| 5,823,570 | A | * | 10/1998 | Lane et al. | ......... | 280/806 |
| 5,967,442 | A | * | 10/1999 | Wier | ......... | 242/379.1 |
| 6,360,980 | B1 | * | 3/2002 | Lee | ......... | 242/379.1 |
| 6,416,006 | B1 | * | 7/2002 | Huber | ......... | 242/379.1 |
| 6,416,008 | B1 | * | 7/2002 | Fujii et al. | ......... | 242/379.1 |
| 6,598,904 | B2 | * | 7/2003 | Nagata et al. | ......... | 280/807 |
| 6,863,235 | B2 | * | 3/2005 | Koning et al. | ......... | 242/379.1 |
| 6,986,480 | B2 | | 1/2006 | Blum et al. | | |
| 7,025,297 | B2 | * | 4/2006 | Bell et al. | ......... | 242/384 |
| 2004/0262441 | A1 | * | 12/2004 | Hiramatsu | ......... | 242/379.1 |
| 2005/0133652 | A1 | | 6/2005 | Kielwein | | |
| 2005/0284978 | A1 | * | 12/2005 | Zolkower | ......... | 242/382.4 |
| 2006/0011764 | A1 | * | 1/2006 | Inagawa et al. | ......... | 242/382 |
| 2006/0163410 | A1 | * | 7/2006 | Blum et al. | ......... | 242/379.1 |
| 2007/0145175 | A1 | * | 6/2007 | Clute | ......... | 242/379.1 |

FOREIGN PATENT DOCUMENTS

| DE | 2727470 A | * | 1/1979 |
| DE | 10343534 | | 4/2004 |
| DE | 10360032 | | 3/2006 |

* cited by examiner

*Primary Examiner* — Sang Kim
(74) *Attorney, Agent, or Firm* — Tarolli, Sundheim, Covell & Tummino LLP

(57) ABSTRACT

A belt retractor has a frame (10), a belt spool (12) that is rotatably mounted in the frame (10), and a force limiter (22) that is adapted to reach a force limiting position. A guide-in mechanism (26) is provided which causes the force limiter (22) to reach the force limiting position as a function of the length of belt webbing withdrawn.

29 Claims, 25 Drawing Sheets

Fig. 7
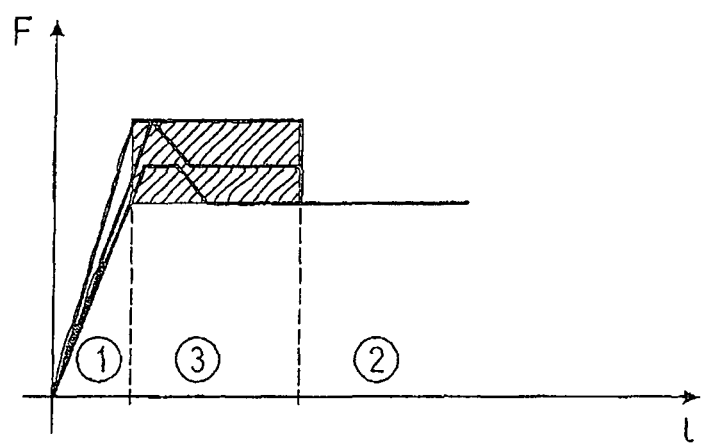
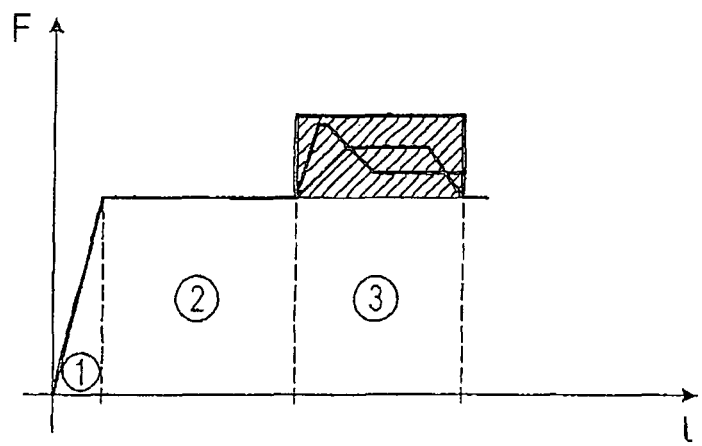

Fig. 27
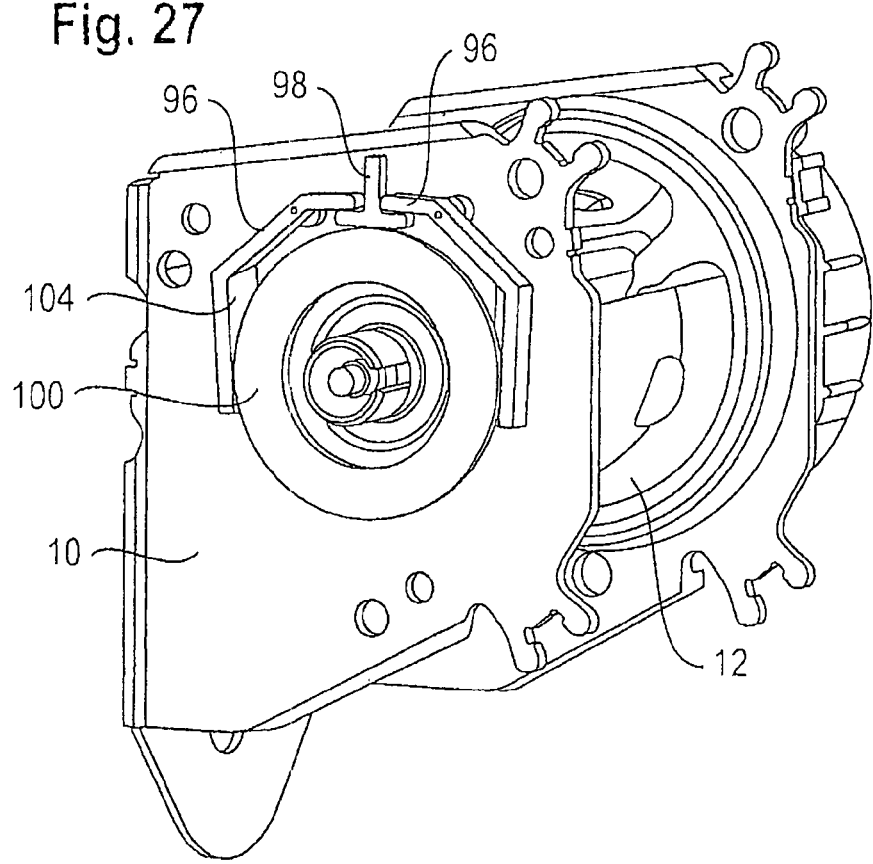
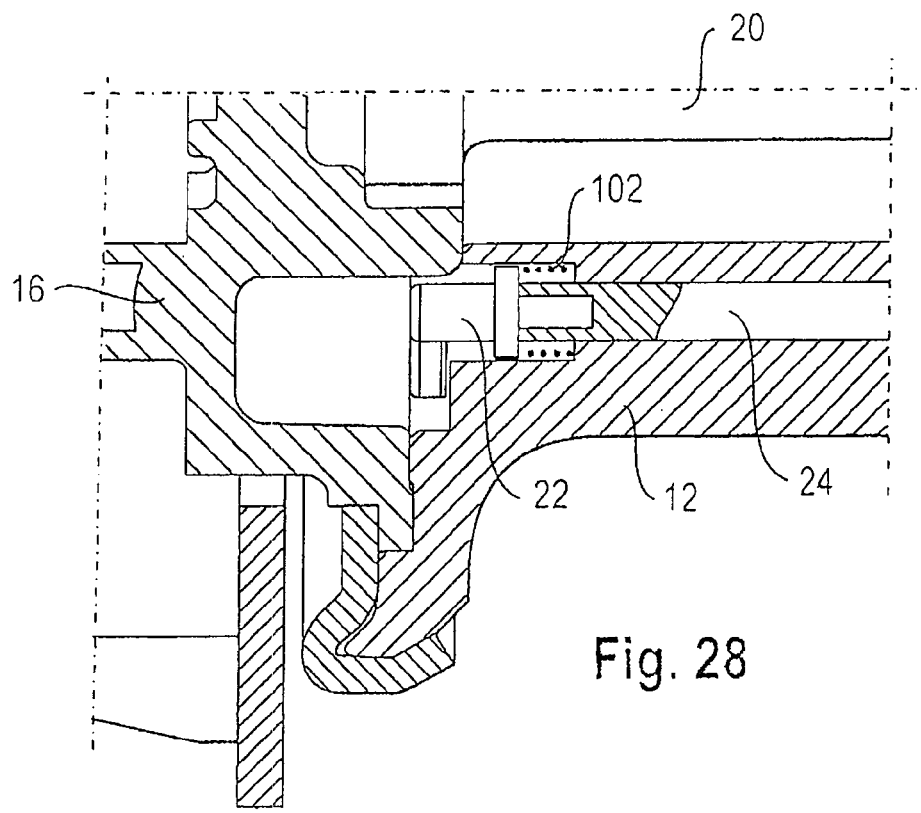
Fig. 28

BELT RETRACTOR

TECHNICAL FIELD

The present invention relates to a belt retractor for a vehicle safety belt.

BACKGROUND OF THE INVENTION

Belt retractors including force limiters which, once a specific tensile force in the safety belt is exceeded, allow a rotation of the belt spool in spite of the belt spool being blocked, are known from the prior art. The forces exerted on a vehicle occupant by the safety belt are reduced in this way.

DE 103 43 534 A1 discloses a belt retractor in which, in addition to a first force limitation by means of a torsion bar, a second force limitation takes place at the same time by a material cutting process which in particular by means of the cutting width and depth parameters allows, in sections, a progressive, degressive or constant evolution of the level of force. The level of force and the evolution thereof is however the same for all occupants.

The invention provides a belt retractor which allows the force level to be adjusted more flexibly.

BRIEF SUMMARY OF THE INVENTION

According to the invention, a belt retractor comprises a frame, a belt spool that is rotatably mounted in the frame, and a force limiter that is adapted to reach a force limiting position. A guide-in mechanism is provided which causes the force limiter to reach the force limiting position as a function of the length of belt webbing withdrawn.

The force limiter is a cutting body, for example, that cuts material in the force limiting position. The force limitation could just as well be effected by means of non-cutting shaping, twisting, upsetting, bending, deep-drawing, material displacement, friction, hydraulics, pneumatics, magnetism, induction etc. The invention allows for the fact that the length of belt webbing withdrawn when buckling up is dependent upon the weight and height of a vehicle occupant. In the event of a crash, the force limiter is caused to reach its force limiting position at differing points in time as a function of the length of belt webbing withdrawn, that is, the vehicle occupant's stature. This means that the belt retractor according to the invention allows a force limitation which is adjusted to the vehicle occupant in an optimum manner.

According to one embodiment, provision is made for a planetary gear that is part of a child safety mechanism. A so-called child safety function is typically activated after a complete withdrawal of the belt webbing. It makes sure that although the completely withdrawn belt webbing can be wound up again on the belt spool, it can no longer be withdrawn from it again, so as to permit a reliable attachment of a child seat to a vehicle seat by means of the safety belt. The underlying mechanism, which provides for a switching process dependent on the length of the belt webbing withdrawn, may be made use of for the invention. In this way, a switching process can be carried out after withdrawal of a particular length of belt webbing, the switching process resulting in the force limiter being guided into the force limiting position. Since the length of belt webbing withdrawn is representative of the height and weight of an occupant, the level of force limitation is thus automatically adjusted depending on the build of the occupant.

BRIEF DESCRIPTION OF THE DRAWINGS

FIG. 7a and FIG. 7b show possible characteristic curves of the force limiter;

FIG. 27 shows a perspective view of a belt retractor according to a tenth embodiment of the invention;

FIG. 28 shows a view of part of the belt retractor of FIG. 27, with a force limiter in an initial position;

BRIEF DESCRIPTION OF THE PREFERRED EMBODIMENTS

Figure 1:
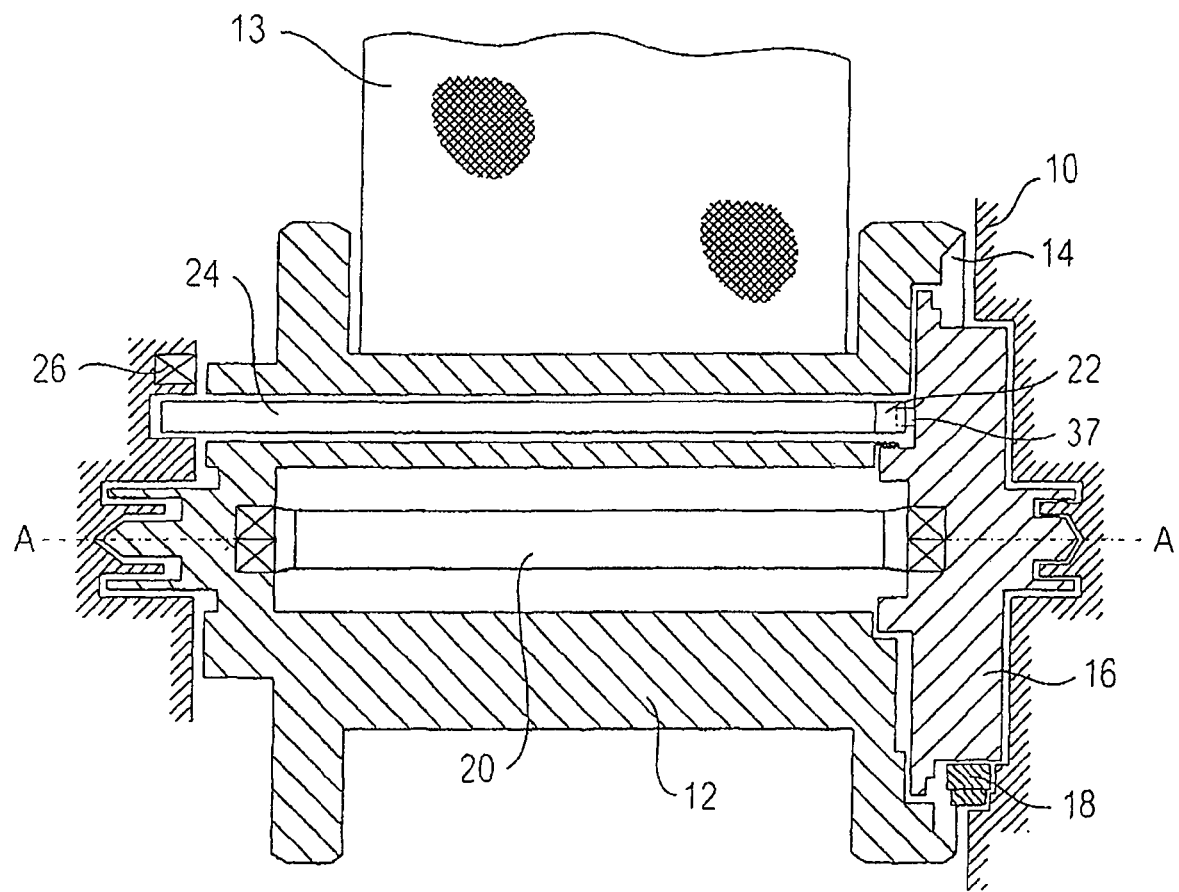
FIG. 1 shows a diagrammatic sectional view of a belt retractor according to a first embodiment of the invention.

The belt retractor diagrammatically shown in FIG. 1 includes a frame 10 and a belt spool 12 rotatably mounted in the frame 10. Belt webbing 13 may be withdrawn from the belt spool 12. Applied to a flange 14 of the belt spool 12 is a disk 16 which can be supported at the frame 10 by a blocking mechanism 18 so as to prevent relative rotation. The disk 16 may be connected with the flange 14 of the belt spool 12 by shear pins (not shown) for joint rotation up to a specific torque.

Arranged in the hollow interior of the belt spool 12 is a torsion bar 20 which is coupled at one axial end for joint rotation with the disk 16 and is coupled at the opposite end for joint rotation with the belt spool 12.

A cutting body 22 is provided which is arranged on a control pin 24 extending through the belt spool 12. The control pin 24, along with the cutting body 22, may be shifted to the right with respect to FIG. 1 from an initial position (FIGS. 1, 3 and 5) into a force limiting position (FIGS. 2, 4 and 6) by a guide-in mechanism 26 (diagrammatically illustrated in FIG. 1) which will be discussed below. In the force limiting position, the cutting body 22 projects axially beyond the end face of the belt spool 12 facing the disk 16 and can cut material of the disk 16 upon a rotation of the belt spool 12 in relation to the disk 16.

According to the invention, the guide-in mechanism 26 causes the cutting body 22 to reach the force limiting position as a function of the length of belt webbing withdrawn. This means that the cutting body 22 is guided in at differing points in time, depending on the height or weight of a vehicle occupant.

Figure 2:
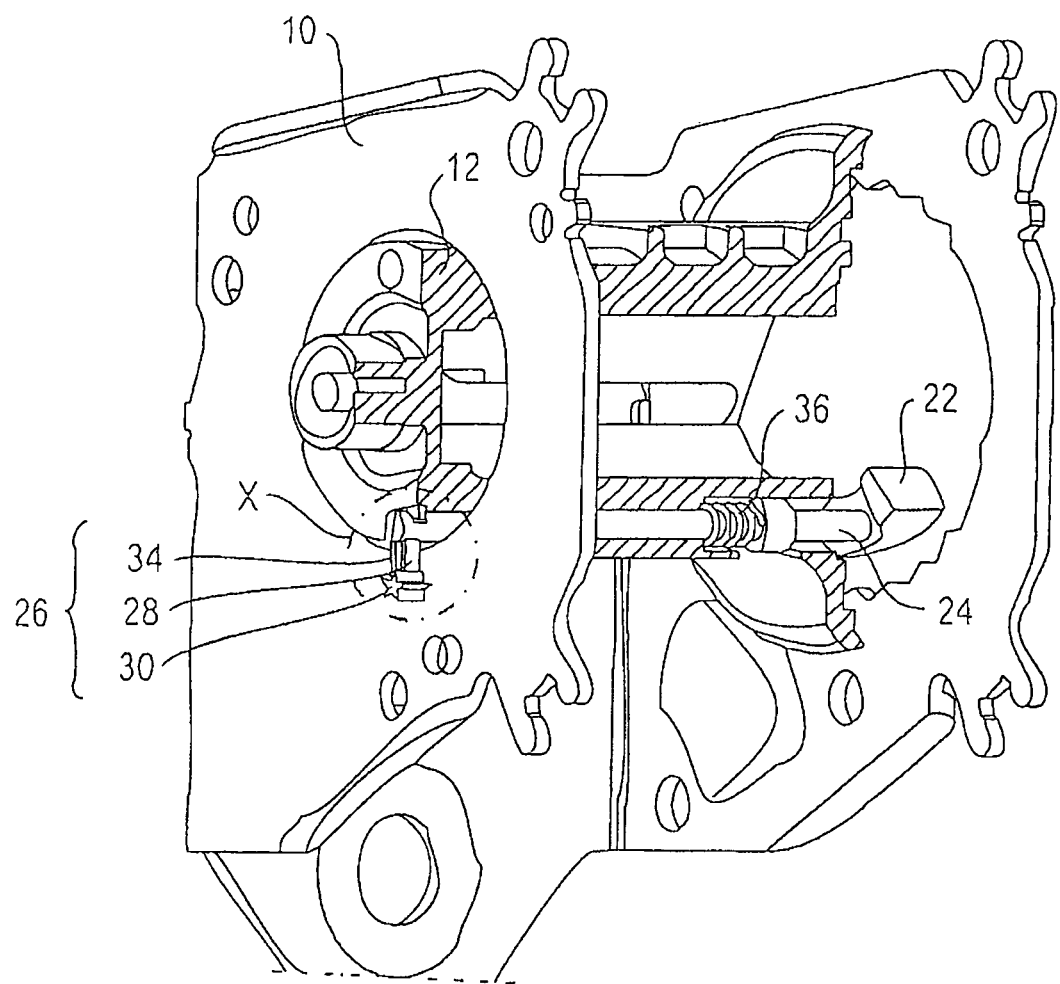
FIG. 2 shows a perspective view of part of the belt retractor of FIG. 1, with a force limiter in a force limiting position.
Figure 3:
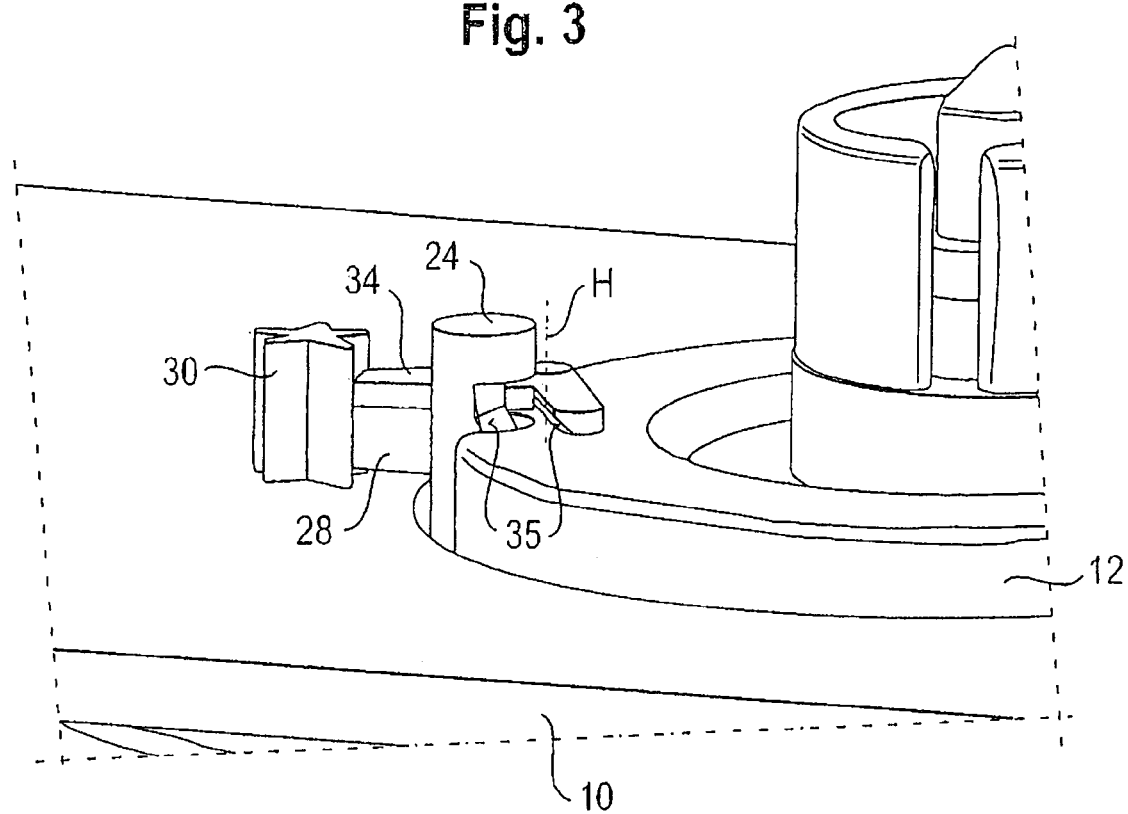
FIG. 3 shows an enlarged detail of the area denoted by X in FIG. 2, with the force limiter in an initial position.
Figure 4:
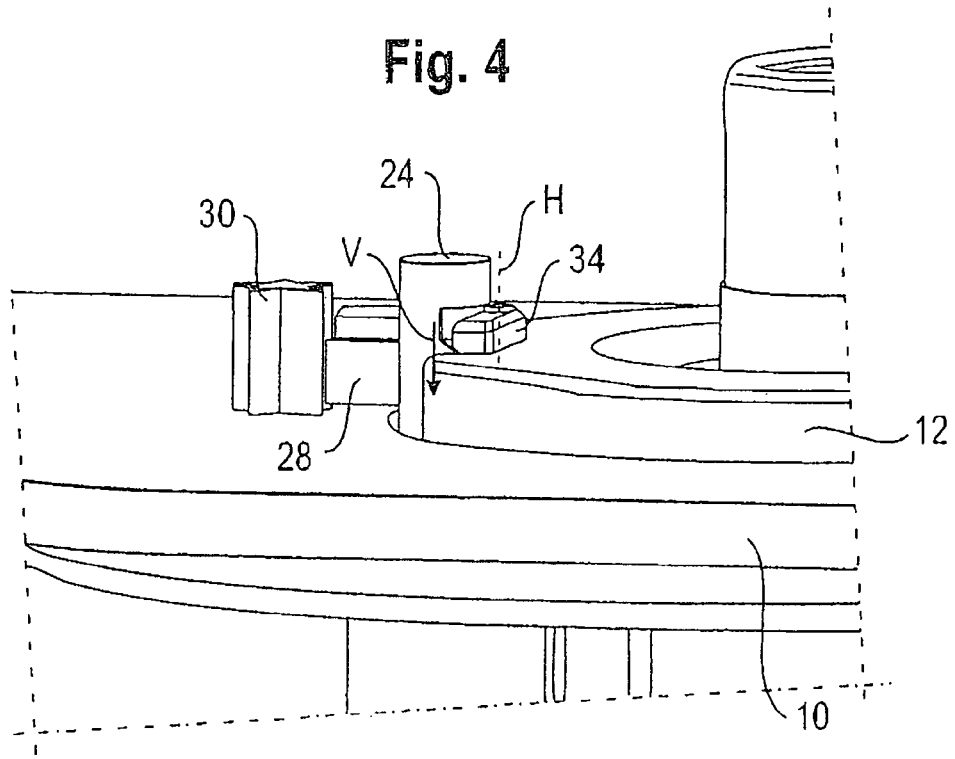
FIG. 4 shows an enlarged detail of the area denoted by X in FIG. 2, with the force limiter in the force limiting position.

The guide-in mechanism 26, which is illustrated in detail in FIGS. 2 to 6, comprises a projection 28 on the belt spool 12 which can mesh with a gearwheel 30 fitted to the frame 10; more specifically, the projection 28 engages the gearwheel 30 once per rotation of the belt spool 12 through 360 degrees. The gearwheel 30 has a longer tooth 32 which can engage an L-shaped lever 34 which is mounted at the belt spool 12 for being shifted about an axis H. The shorter teeth rotate freely past the lever 34. The lever 34, in turn, is adapted to engage the control pin 24, causing it to be shifted towards the disk 16 (arrow V in FIG. 4). In order to make it easier for the lever 34 to shift the control pin 24, the lever 34 and the control pin 24 each have an inclined plane 35 (FIG. 3).

The mode of functioning of the belt retractor will be discussed in the following.

When a vehicle occupant fastens the safety belt, a particular length of belt webbing is withdrawn from the belt spool 12, depending on the occupant's stature. As belt webbing is withdrawn (see arrow A in FIGS. 5 and 6), the projection 28 rotates the gearwheel 30 by one tooth (arrow A') each time the belt spool 12 rotates through 360 degrees.

After a defined withdrawal length of belt webbing, which is selected so as to correspond to a taller or heavier vehicle occupant, the long tooth 32 engages the lever 34, so that the lever 34 is shifted about its axis H. The lever 34 engages the control pin 24, which causes the control pin 24 to be shifted downwards with respect to FIG. 3, contrary to the force of a spring-elastic member 36 (FIG. 2). In the process, the cutting body 22, which is fitted to the opposite end of the control pin 24, is shifted from the initial position to the force limiting position, in which it projects beyond the end face of the belt spool 12 facing the disk 16.

In the event the disk 16 is blocked and a belt webbing withdrawal force is exerted on the belt spool 12 which is greater than the torsion section modulus of the torsion bar 20, the torsion bar 20 is twisted and the belt spool 12 will rotate in relation to the disk 16. Since the cutting body 22 is in its force limiting position, in which it projects axially beyond the end face of the belt spool 12 facing the disk 16, material of the disk 16 will be cut upon rotation of the belt spool 12 relative to the disk 16. This means that two force limiters are effective in parallel.

Figure 5:
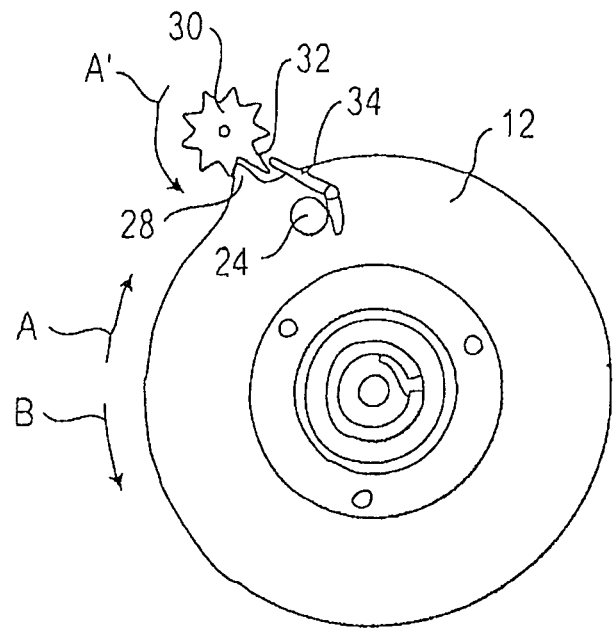
FIG. 5 shows a diagrammatic side view of a part of the belt retractor in the position shown in FIG. 3.
Figure 6:
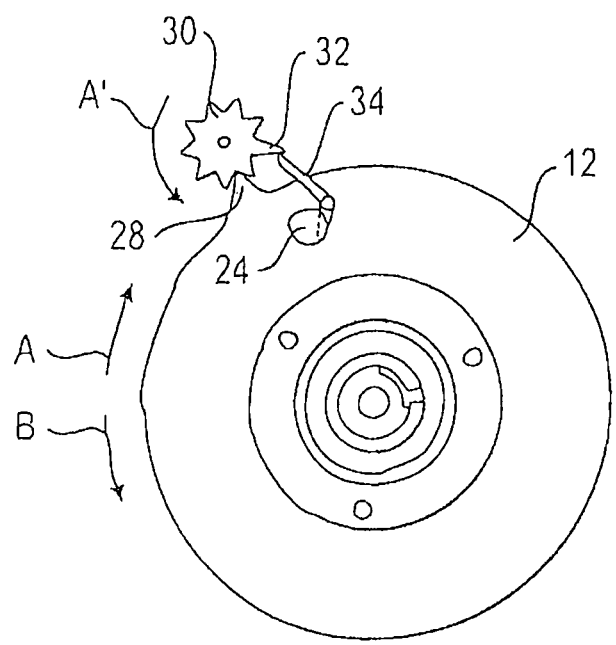
FIG. 6 shows a diagrammatic side view of a part of the belt retractor in the position shown in FIG. 4.

If, on the other hand, there is no relative rotation between the disk 16 and the belt spool 12 while the cutting body 22 is in the force limiting position, but rather a retraction of belt webbing occurs, the long tooth 32 of the gearwheel 30 engages the lever 34 to shift it about the rotation axis H into its initial position when the belt spool 12 is rotated in the direction B (FIGS. 5 and 6). Since the lever 34 no longer holds the control pin 24 in the force limiting position, the control pin 24, along with the cutting body 22, is urged back into the initial position by the spring-elastic member 36.

When a thinner or smaller vehicle occupant buckles up, the belt spool 12 does not perform as many rotations and the projection 28 does not engage the gearwheel 30 as many times as in the case of a bigger or heavier vehicle occupant. The gearwheel 30 is therefore not turned as far, and the long tooth 32 of the gearwheel 30 does not engage the lever 34 when the smaller or thinner vehicle occupant wears the belt.

As soon as a blocking of the disk 16 occurs with a smaller or lighter vehicle occupant wearing the belt and a force acts on the belt spool 12 that is greater than the torsion section modulus, the torsion bar 20 is twisted, which will result in a relative rotation between the disk 16 and the belt spool 12 and in a withdrawal of belt webbing. The cutting body 22, which is in the initial position, will not cut any material of the disk 16 here. The withdrawal of belt webbing and the rotation of the belt spool 12 in the frame 10 cause the projection 28 to mesh with the gearwheel 30. If the vehicle occupant has already withdrawn a certain length of belt webbing in putting on the belt, the long tooth 32 of the gearwheel 30 engages the lever 34 and the cutting body 22 is moved to the force limiting position, so that upon a further belt webbing withdrawal, material of the disk 16 will be cut.

A control projection that has been described in detail in DE 103 43 534 A1 may be used in order that the cutting body 22 cuts material of the disk 16 in the case of a thinner or smaller vehicle occupant after a specific length of belt webbing withdrawal contrary to the force of the torsion bar 20 which corresponds to about one rotation of the belt spool 12. The control projection 37 (shown diagrammatically in FIG. 1) is arranged on the end face of the disk 16 facing the belt spool 12 and, after a relative rotation of about 360 degrees between the belt spool 12 and the disk 16, engages the cutting body 22 and pushes it over an inclined plane of the belt spool 12 into a position in which it projects axially beyond the end face of the belt spool 12 facing the disk 16, i.e. in which it is in its force limiting position. Upon a further relative rotation between the belt spool 12 and the disk 16 the control projection is sheared off and material of the disk 16 is cut. The control projection 37 thus activates an additional force limitation by means of a cutting operation after a specific period of time.

The cutting body 22 could also be actively shifted towards the disk 16 by means of a sensor system (not shown) provided in the vehicle.

In the graphs shown in FIGS. 7a and 7b the force F is plotted versus the belt webbing withdrawal length l.

FIG. 7a represents the characteristic curve for a thinner or smaller vehicle occupant. Initially, with the disk 16 locked, withdrawal of belt webbing is attained with a small, increasing force due to the belt webbing being stretched and due to the film reel effect (zone 1). Then a force limitation is effected solely by the torsion bar 20 (zone 2). A force limitation by cutting is additionally activated only later (zone 3), with an additional control projection disclosed in DE 103 43 534 A1 defining the latest possible moment for the activation of the additional force limitation by cutting.

FIG. 7b represents the characteristic curve for a heavier or taller vehicle occupant. After an initial withdrawal of belt webbing with a small, increasing force due to the belt webbing being stretched and due to the film reel effect (zone 1), the force limitation is achieved both by means of cutting and by means of torsion (zone 3), since the force limiter is in the force limiting position. After one rotation of the belt spool 12 through 360 degrees a force limitation is attained solely by means of torsion (zone 2) because after one 360 degrees rotation, the cutting body 22 has cut a closed annular groove into the disk 16 and now no longer cuts any material.

Both with a thinner or lighter vehicle occupant and also with a heavier or taller vehicle occupant the profile of the characteristic curve where the force is limited by means of material cutting (cf. hatched area) may be realized in many ways. For example, a varying width of cut and/or depth of cut may result in a progressive or a degressive characteristic curve.

The various embodiments will be discussed below, with identical reference numerals being used for the components known from the first embodiment; in this respect, reference is made to the explanations above.

Figure 8:
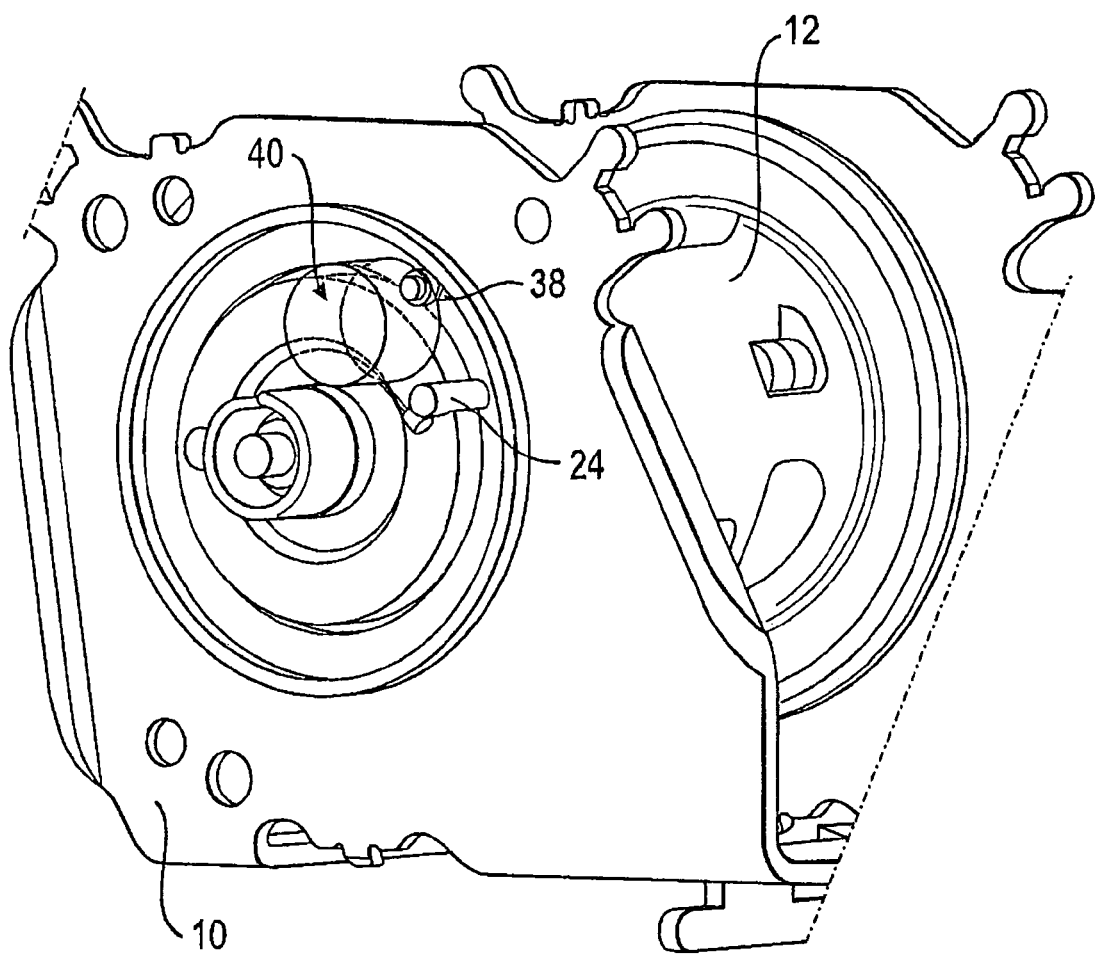
FIG. 8 shows a perspective view of a belt retractor according to a second embodiment of the invention.
Figure 9:
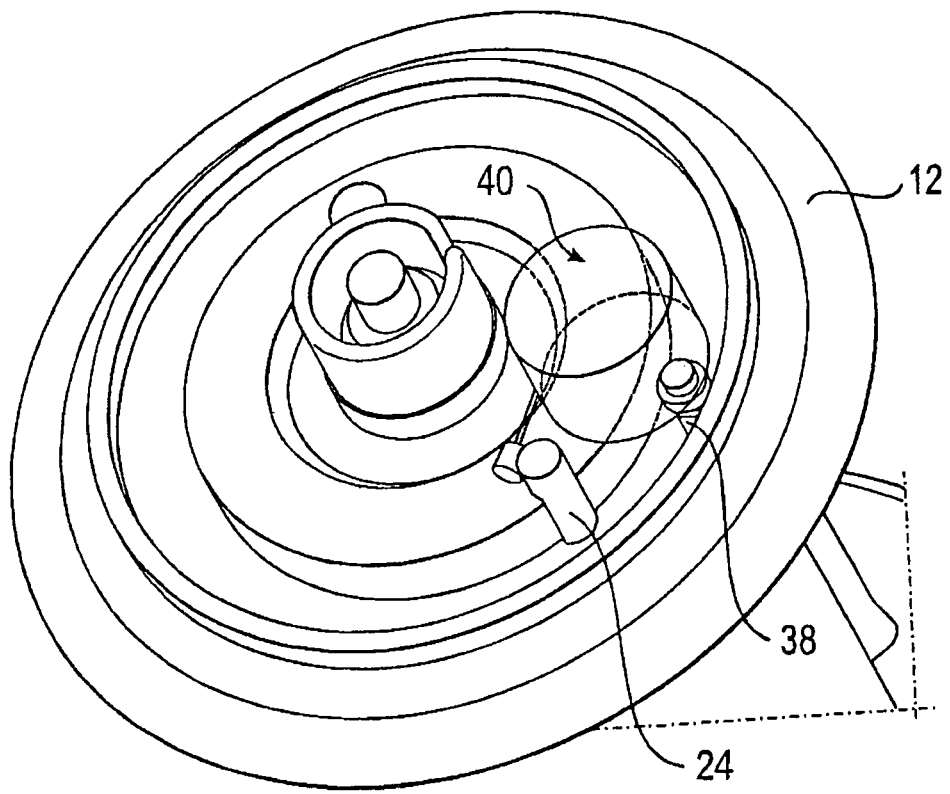
FIG. 9 shows a perspective view of part of a belt spool of the belt retractor of FIG. 8, with a drive dog.
Figure 10:
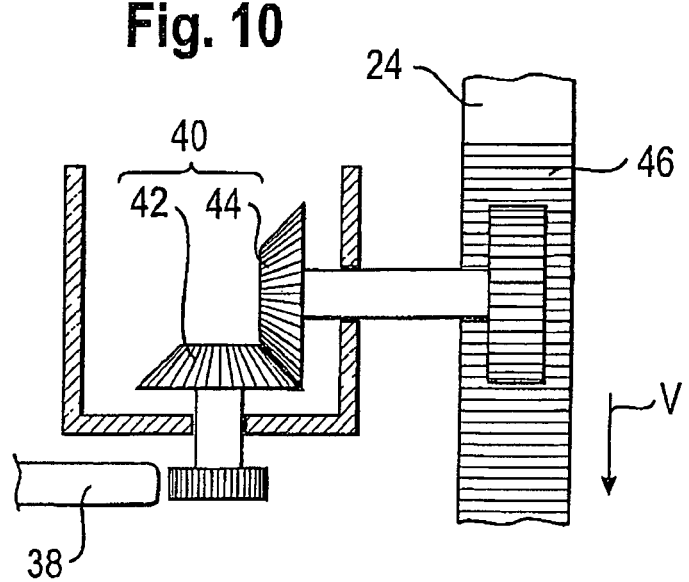
FIG. 10 diagrammatically shows a transmission gearing of the belt retractor according to FIGS. 8 and 9.
Figure 11:
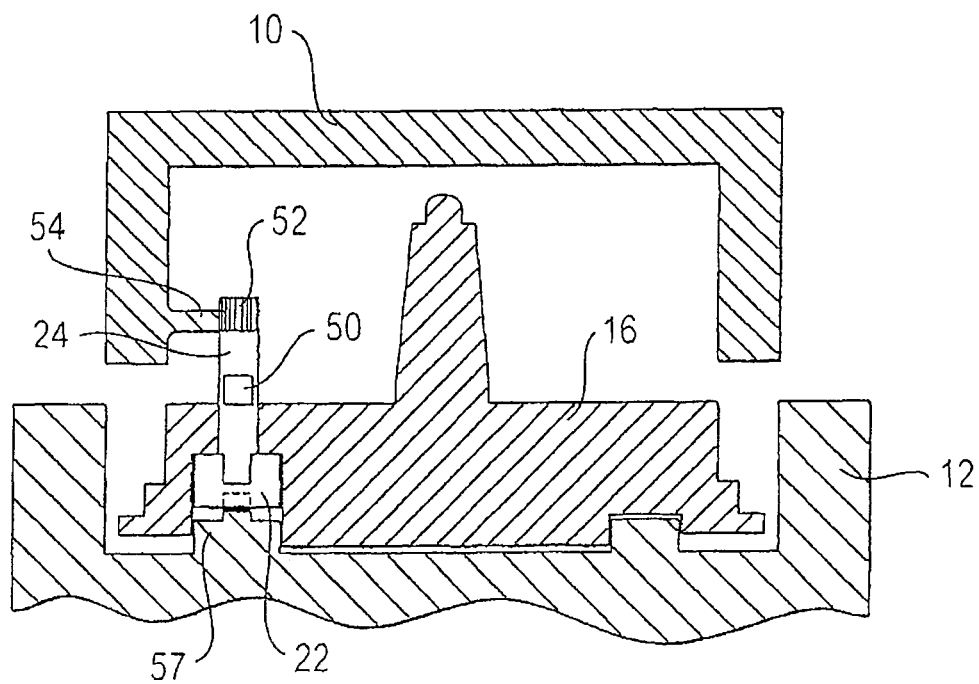
FIG. 11 shows a view of part of a belt retractor according to a third embodiment of the invention, with a force limiter in an initial position.
Figure 12:
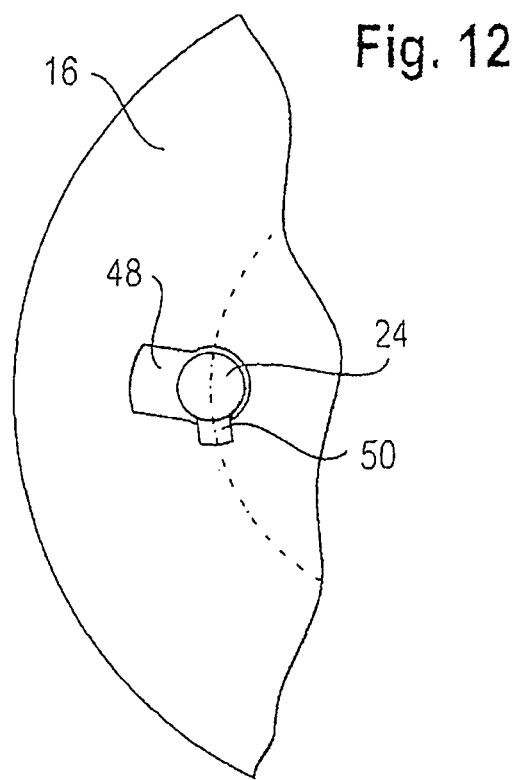
FIG. 12 shows a diagrammatic side view of a part of the belt retractor of FIG. 11.
Figure 13:
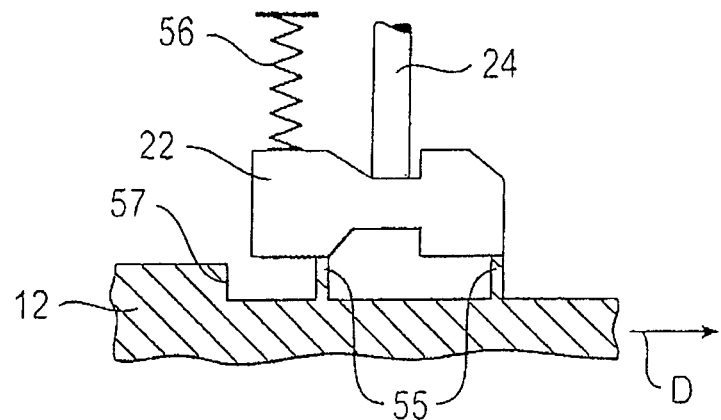
FIG. 13 shows a diagrammatic sectional view of part of the belt retractor of FIGS. 11 and 12, with the force limiter in an initial position.

FIGS. 8 to 10 show a second embodiment of the belt retractor. The belt retractor differs from the first embodiment in that the guide-in mechanism 26 includes a transmission gearing 40 in the form of a bevel gear pair having input and output gears 42, 44, by means of which a rotation of the belt spool 12 is converted into a translational movement of the control pin 24.

When belt webbing is withdrawn and, hence, the belt spool is rotated, a drive dog 38 fitted to the frame 10 engages the input gear 42 of the transmission gearing 40; it does so once per rotation of the belt spool 12 through 360 degrees. The input gear 42 meshes with the output gear 44. The output gear 44 in turn engages teeth 46 provided on the control pin 24 and shifts it towards the disk 16 (cf. arrow V in FIG. 10).

After a defined length of belt webbing withdrawn, which is selected such that it corresponds to a heavier or taller vehicle occupant, the control pin 24 has been axially shifted so far that the cutting body 22, arranged on the opposite end of the control pin 24, is in its force limiting position, in which it projects beyond the end face of the belt spool 12 facing the disk 16.

When the cutting body 22 is in the force limiting position and a relative rotation occurs between the disk 16 and the belt spool 12, the cutting body 22 cuts material of the disk 16.

When, on the other hand, a retraction of belt webbing occurs, the input gear 42 is turned by the drive dog 38 such that the output gear 44 meshing with the input gear 42 moves the control pin 24 away from the disk 16 (i.e., upwards with respect to FIG. 10). In this way, the cutting body 22 will return to its initial position.

With a smaller or thinner vehicle occupant, after the disk 16 is blocked and while the belt spool 12 rotates relative to the disk 16, the cutting body 22 is shifted towards the disk 16 by the control projection at the latest.

FIGS. 11 to 15 show a third embodiment of the belt retractor.

The cutting body 22 is arranged on the control pin 24 which extends through the disk 16 and, in the initial position, rests on projections 55 (FIG. 13) of the belt spool 12. The end of the control pin 24 remote from the cutting body 22 is provided with a splined profile 52 for engagement by a projection 54 of the frame 10.

Figure 14:
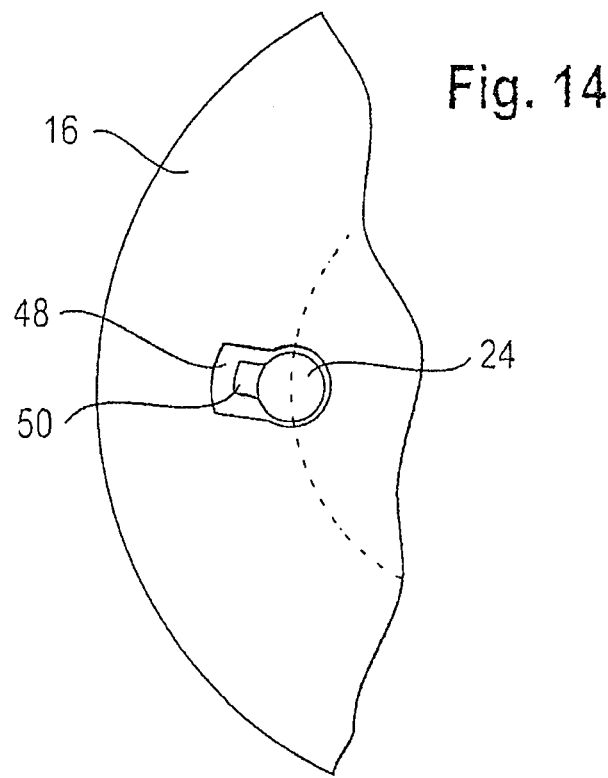
FIG. 14 shows a diagrammatic side view of a part of the belt retractor of FIGS. 11 to 13.

When belt webbing is withdrawn, the belt spool 12 rotates together with the disk 16 within the frame 10. Upon a rotation of the belt spool 12 through 360 degrees the projection 54 provided on the frame 10 engages the splined profile 52 of the control pin 24, as a result of which the control pin 24 is rotated. Upon a rotation of the control pin 24 a lug 50 arranged on the control pin 24 will also change its position towards an opening 48 of the disk 16 until after a defined belt webbing withdrawal the lug 50 is in alignment with the opening 48 (FIG. 14).

Figure 15:
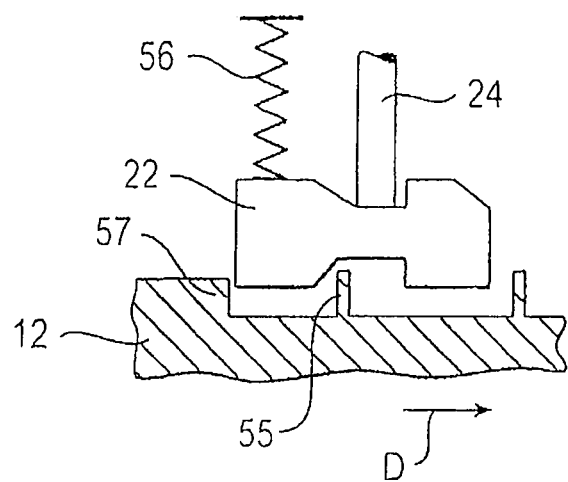
FIG. 15 shows a diagrammatic sectional view of part of the belt retractor of FIGS. 11 to 14, with the force limiter in a force limiting position.

As soon as a relative rotation takes place between the belt spool 12 and the disk 16, that is, a movement of the belt spool 12 in the belt webbing withdrawal direction (cf. arrow D in FIG. 13), the projections 55, which are part of the belt spool 12, are pulled away from under the cutting body 22. A spring-elastic member 56 which engages the cutting body 22 and rests against the disk 16, urges the cutting body 22 towards the belt spool 12. Since the lug 50 lies above the opening 48 and can move through it, the control pin 24, along with the cutting body 22, is moved by the spring-elastic member 56 towards the belt spool 12 (FIG. 15). Upon a further withdrawal of belt webbing the cutting body 22 will then cut material of the belt spool 12 (surface 57).

If there is no rotation of the belt spool 12 relative to the disk 16, the projections 55 are not pulled away from under the cutting body 22 so that the latter can not be shifted towards the belt spool 12 by the spring-elastic member 56. When belt webbing is retracted, the projection 54 engages the control pin 24 upon rotation of the belt spool 12 and shifts the lug 50 such that it is no longer aligned with the opening 48.

When a smaller or thinner vehicle occupant buckles up, the projection 54 does not engage the splined profile 52 as many times, so that the lug 50 is not in alignment with the opening 48, rests upon the disk 16, and can not move through the opening 48. Therefore, when a relative rotation occurs between the belt spool 12 and the disk 16, the spring-elastic member 56 which urges the cutting body 22 towards the belt spool 12 can not shift the cutting body 22 into the force limiting position. As a result, the cutting body 22 remains in the position in which it does not engage the belt spool 12 until, after a rotation of the belt spool 12 relative to the disk 16 through about 360 degrees, it strikes against the control projection disclosed in DE 103 43 534 A1, which is arranged on the belt spool 12. The control projection shoves the cutting body 22 along an inclined plane and into the force limiting position, the force acting on the lug 50 being so high that the lug 50 breaks. In the case of a continued relative rotation between the disk 16 and the belt spool 12 the control projection will be sheared off.

Figure 16:
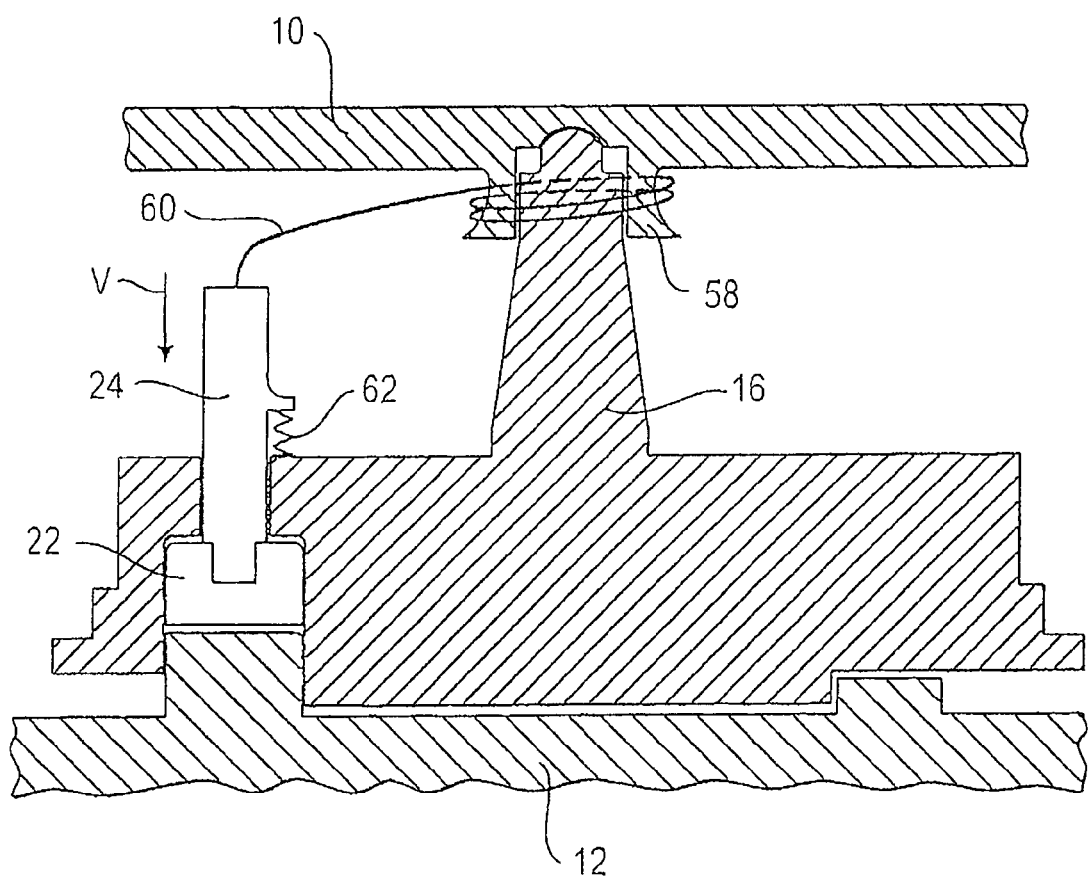
FIG. 16 shows a view of part of a belt retractor according to a fourth embodiment of the invention.

FIG. 16 shows a fourth embodiment.

In this embodiment the guide-in mechanism 26 includes a rope pulley 58 which is part of the frame 10 in which the disk 16 and the belt spool 12 are rotatably mounted. A rope 60 is provided which is adapted to be wound up on and unwound from the rope pulley 58. One end of the rope 60 is attached to the rope pulley 58 and the opposite end of the rope 60 is connected with the control pin 24. The control pin 24, along with the cutting body 22, is urged into the force limiting position by a spring-elastic member 62.

In the position in which no belt webbing 13 is withdrawn from the belt spool 12, the rope 60 is fully wound on the rope pulley 58 (FIG. 16). When belt webbing is withdrawn, the rope 60 is unwound from the rope pulley 58. The length of the rope 60 paid out accordingly increases with each rotation of the belt spool 12. As soon as a specific length of the rope 60 has been unwound from the rope pulley 58, the spring-elastic member 62 can urge the control pin 24 and the cutting body 22 downwards with respect to FIG. 16 (cf. arrow V in FIG. 16) into the force limiting position.

Upon a relative rotation between the disk 16 and the belt spool 12, which occurs when the force acting on the belt spool 12 exceeds the section modulus of the torsion bar 20 (FIG. 1), the torsion bar 20 is twisted and the cutting body 22, which is in its force limiting position, cuts material of the belt spool 12.

In case a retraction of belt webbing occurs, rather than a relative rotation between the disk 16 and the belt spool 12, when the belt spool 12 is rotated the rope 60 is wound up on the rope pulley 58 contrary to the force of the spring-elastic member 62 until the control pin 24 along with the cutting body 22 has returned to the initial position.

When a smaller or thinner vehicle occupant fastens the safety belt, less rope 60 is withdrawn from the rope pulley 58, so that when the disk 16 is blocked the cutting body 22 is not in its force limiting position. In case a relative rotation occurs between the belt spool 12 and the disk 16, the material of the belt spool 12 will not be cut. Only after a rotation of the belt spool 12 is the cutting body 22 moved into the force limiting position by the control projection known from DE 103 43 534 A1.

Figure 17:
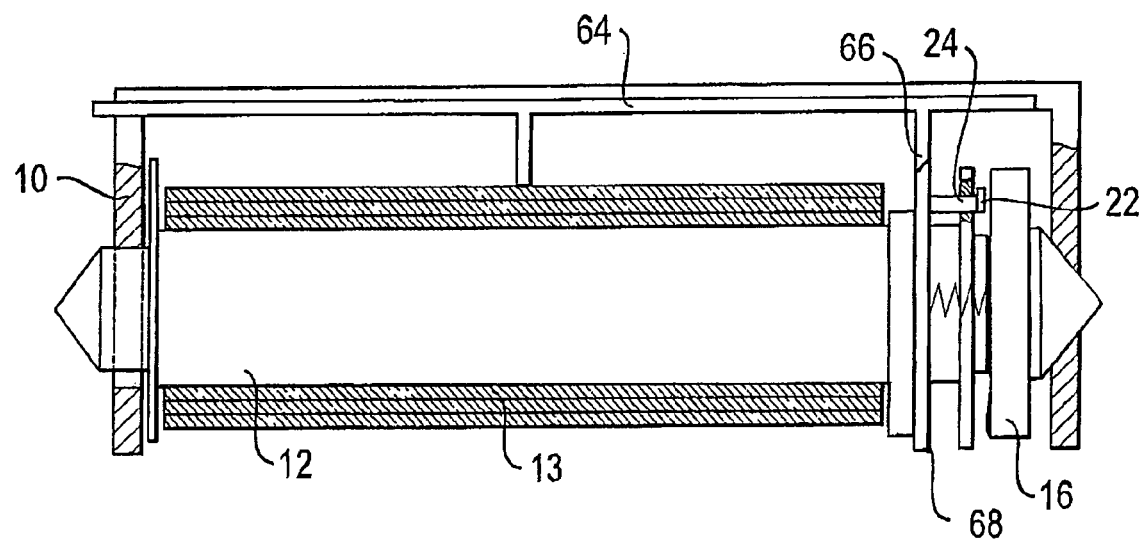
FIG. 17 diagrammatically shows a belt retractor according to a fifth embodiment of the invention, with a force limiter in an initial position.
Figure 18:
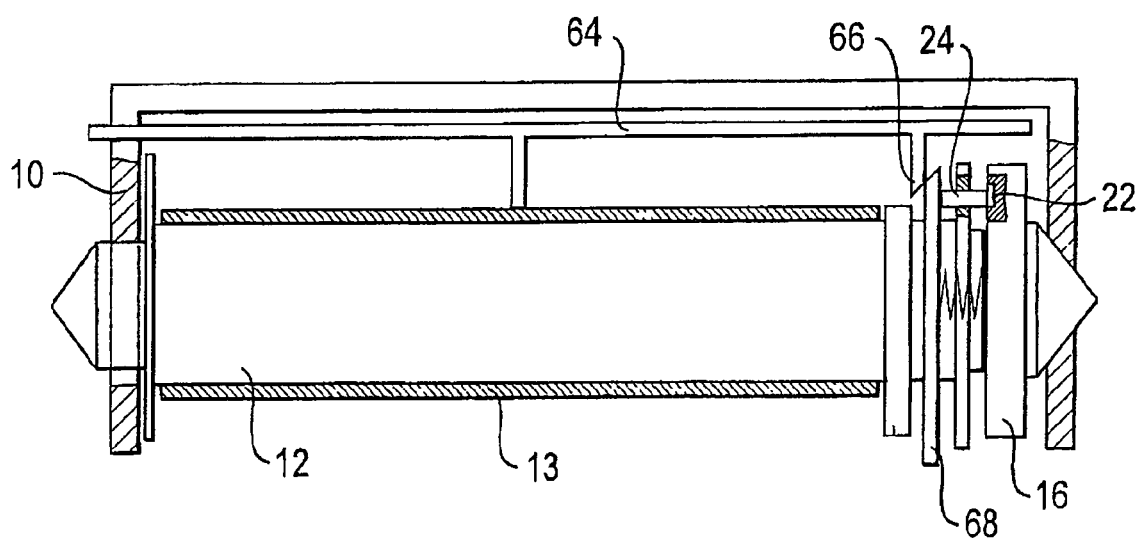
FIG. 18 diagrammatically shows the belt retractor of FIG. 17, with the force limiter in a force limiting position.

FIGS. 17 and 18 show a fifth embodiment of the belt retractor.

A member 64 is provided parallel to the axis of the belt spool 12, which rests on the belt webbing 13 wound on the belt spool 12 and can move radially in relation to the belt spool 12 as a function of the amount of belt webbing 13 unwound from the belt spool 12. More specifically, with little belt webbing 13 wound on the belt spool, the member 64 is closer to the belt spool 12 than when much of the belt webbing 13 is in the wound-on condition. While the member 64 is shifted towards the belt spool 12, after a defined length of belt webbing has been withdrawn an extension 66 of the member 64 engages a plate 68 that is movable axially in relation to the belt spool 12. When the plate 68 is moved the control pin 24 is shifted axially away from the belt spool 12 and the cutting body 22 fixed to the control pin 24 is brought into its force limiting position, so that upon a relative rotation between the belt spool 12 and the disk 16, material of the disk 16 is cut.

When no relative rotation between the belt spool 12 and the disk 16 takes place but, rather, a retraction of belt webbing, belt webbing 13 is wound up on the belt spool 12. In the process the member 64 will shift radially away from the belt spool 12 and the cutting body 22 reaches its initial position (FIG. 17).

Where a smaller or thinner vehicle occupant is involved, the cutting body 22 is not moved into the force limiting position by the control projection until after a rotation of the belt spool 12 through 360 degrees.

The control pin 24 and the plate 68 may just as well be made in one piece.

Figure 19:
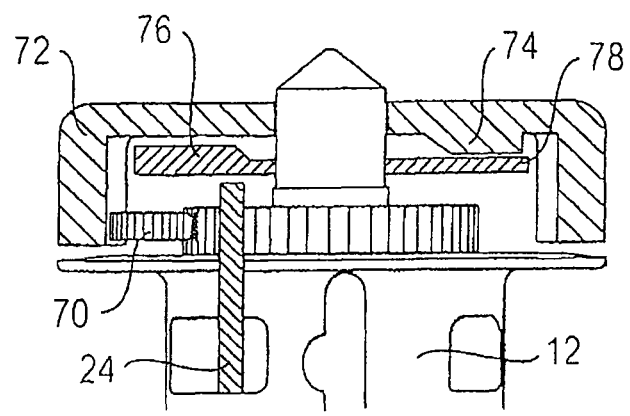
FIG. 19 shows a view of part of a belt retractor according to a sixth embodiment of the invention, with a force limiter in an initial position.
Figure 20:
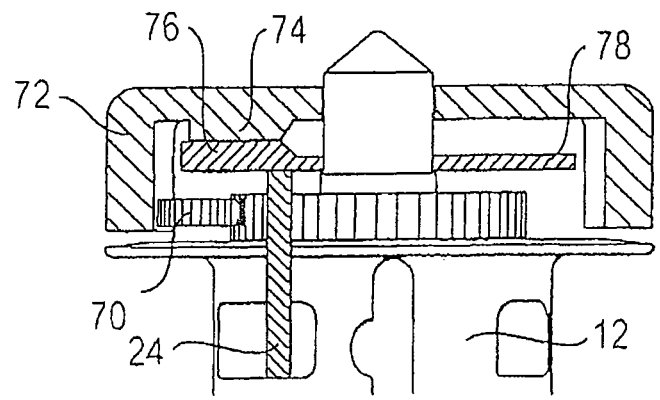
FIG. 20 shows a view of part of the belt retractor of FIG. 19, with the force limiter in a force limiting position.

In FIGS. 19 and 20 a sixth embodiment of the belt retractor is shown. Provision is made for a planetary gear having a planet wheel 70 and a ring gear 72, the planet wheel 70 being coupled to the belt spool 12 such that the planet wheel 70 is rotated with each rotation of the belt spool 12. Owing to the rotation of the planet wheel 70, the ring gear 72 is likewise rotated at a desired, adjustable gear ratio. The ring gear 72 has an elevated portion 74 which, when a specific length of belt webbing has been withdrawn, is in alignment with an elevated portion 76 of an intermediate disk 78 which is non-rotatably arranged between the ring gear 72 and the belt spool 12 and can be shifted axially towards the belt spool 12.

As soon as the elevated portions 74, 76 are in alignment with each other, the intermediate disk 78 is displaced axially (FIG. 20). The intermediate disk 78 then engages the control pin 24 and guides the cutting body 22 (not shown) into its force limiting position, in which it projects axially beyond the end face of the belt spool 12 facing the disk 16. Upon a rotation of the belt spool 12 relative to the disk 16, the cutting body 22 will cut material of the disk 16.

When the cutting body 22 is in a force limiting position and belt webbing 13 is retracted, the ring gear 72 rotates relative to the intermediate disk 78 since the intermediate disk 78 is rotationally fixed. As soon as the elevated portions 74, 76 of the ring gear 72 and the intermediate disk 78, respectively, no longer coincide, the control pin 24, together with the cutting body 22, may be moved to the initial position (FIG. 19) by a spring-elastic member (not shown).

In the case of a smaller or thinner vehicle occupant, the cutting body 22 is not moved into the force limiting position by the control projection until after a rotation of the belt spool 12 through 360 degrees.

Figure 21:
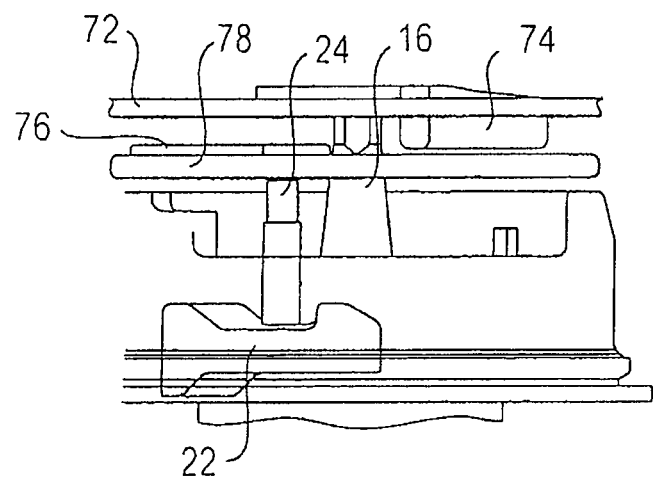
FIG. 21 shows a view of part of a belt retractor according to a seventh embodiment of the invention, with a force limiter in an initial position.
Figure 22:
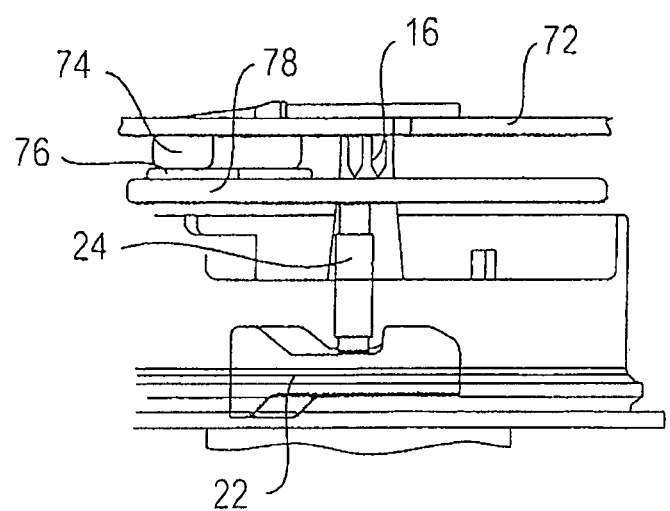
FIG. 22 shows a view of part of the belt retractor of FIG. 21, with the force limiter in a force limiting position.

FIGS. 21 and 22 show a seventh embodiment of the belt retractor, which differs from the embodiment shown in FIGS. 19 and 20 only in that the planetary gear is part of an existing child safety mechanism and that when it is in its force limiting position, the cutting body 22 protrudes beyond the end face of the disk 16 facing the belt spool 12. The principle of the mechanism of the child safety function provides for a switching process which is dependent on the length of belt webbing 13 withdrawn. This mechanism can be designed such that after a particular length of belt webbing withdrawal the cutting body 22 is caused to engage. A child safety mechanism is known, so that it will not be discussed herein in greater detail.

Figure 23:
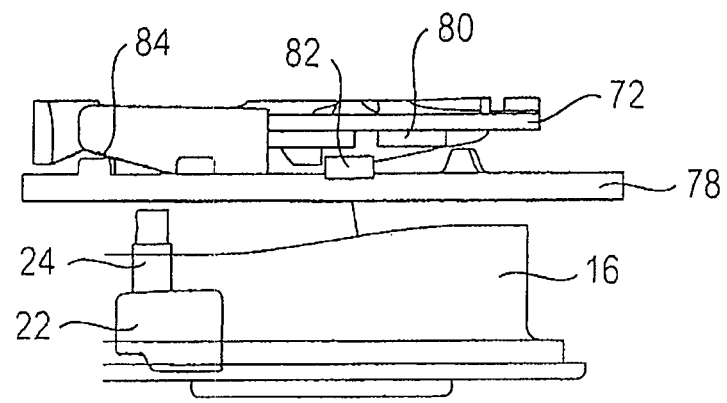
FIG. 23 shows a perspective view of part of a belt retractor according to an eighth embodiment of the invention, with a force limiter in an initial position.
Figure 24:
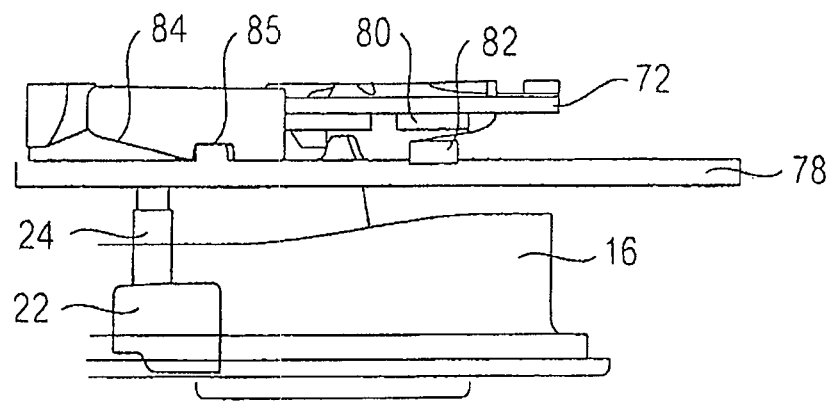
FIG. 24 shows a view of part of the belt retractor of FIG. 23, with the force limiter in a force limiting position.

FIGS. 23 and 24 show an eighth embodiment of the belt retractor, which differs from the embodiment shown in FIGS. 21 and 22 only in that the ring gear 72 includes a magnet 80 and the intermediate disk 78 includes an iron core 82.

When belt webbing is withdrawn, the movement of the belt spool 12 is transferred to the ring gear 72 via the planet wheel 70 (FIGS. 19 and 20). After a specific belt webbing withdrawal the magnet 80 of the ring gear 72 is situated above the iron core 82 of the intermediate disk 78 (with respect to FIG. 24). Upon a further withdrawal of belt webbing the intermediate disk 78 is rotated together with the ring gear 72 owing to the force of attraction of the magnet 80.

In doing so, the intermediate disk 78 moves along an inclined plane 84 which is part of the frame 10, until it contacts a stop 85. The movement of the intermediate disk 78 along the inclined plane 84 causes the intermediate disk 78 to be shifted axially towards the control pin 24, and the cutting body 22 mounted to the opposite end of the control pin 24 reaches its force limiting position. If a relative rotation of the belt spool 12 and the disk 16 occurs, material of the belt spool 12 will be cut.

When, on the other hand, belt webbing is retracted, the intermediate disk 78 is shifted along the inclined plane 84 by the magnet 80, so that the intermediate disk 78 moves axially away from the belt spool 12 and the cutting body 22 reaches its initial position.

If a smaller or thinner vehicle occupant is involved, the cutting body 22 is not moved into the force limiting position by the control projection (not shown) until after a rotation of the belt spool 12 through 360 degrees.

It would be just as possible for a plurality of magnets to be arranged, or for the magnet to be part of the intermediate disk and the iron core to be part of the ring gear.

Figure 25:
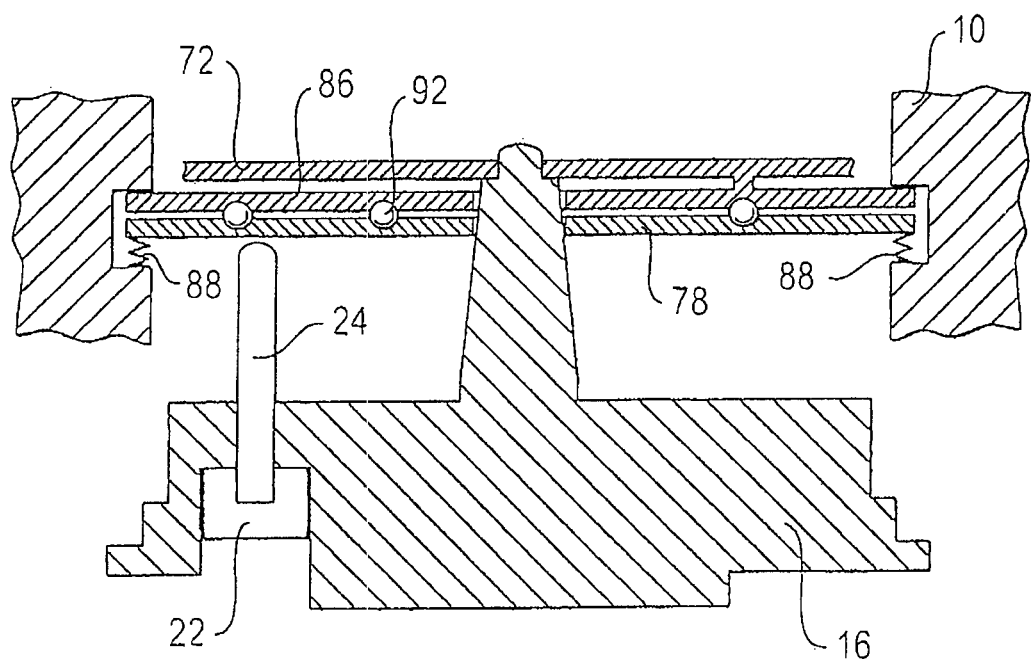
FIG. 25 shows a view of part of a belt retractor according to a ninth embodiment of the invention, with a force limiter in an initial position.
Figure 26:
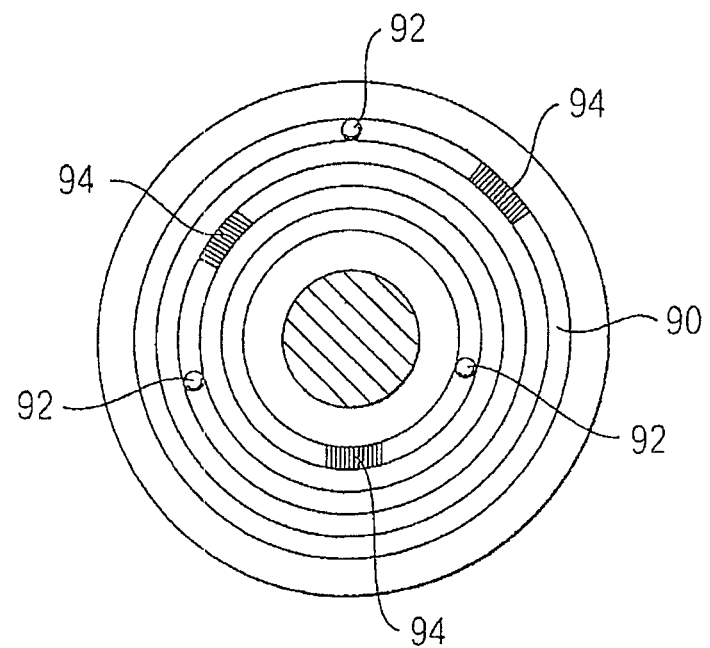
FIG. 26 shows a side view of an intermediate disk of the belt retractor of FIG. 25.

FIGS. 25 and 26 show a ninth embodiment of the belt retractor, which differs from the embodiment shown in FIGS. 21 and 22 only in that a coupling disk 86 is provided which is connected to the ring gear 72 of the planetary gear. The ring gear 72 is connected to the planet wheel 70 (FIGS. 19 and 20) and is rotated upon each rotation of the belt spool 12.

The intermediate disk 78 is axially displaceable contrary to a force of at least one spring-elastic member 88 and has ball tracks 90 provided therein, with balls 92 moving in the ball tracks 90, the balls 92 being borne in the coupling disk 86. In the course of belt webbing withdrawal, the ring gear 72 together with the coupling disk 86 is rotated through a defined angle per rotation of the belt spool 12 about its axis. In the process, the balls 92 mounted in the coupling disk 86 move in the ball tracks 90 of the intermediate disk 78. After a specific belt webbing withdrawal, the balls 92 reach sections having inclined planes 94 in the ball tracks 90 and move along the inclined planes 94. This is accompanied by an axial displacement of the intermediate disk 78 contrary to the force of the spring-elastic member 88. Owing to its axial displacement, the intermediate disk 78 engages the control pin 24, moves it in the axial direction (in relation to the axis of rotation of the belt spool 12) together with the cutting body 22 and guides the latter into its force limiting position, so that upon a rotation of the belt spool 12 relative to the disk 16 material of the belt spool 12 is cut.

During a belt webbing retraction, on the other hand, the cutting body 22 is restored to its initial position.

Again, where a smaller or thinner vehicle occupant is involved, the cutting body 22 is moved to the force limiting position by the control projection (not shown) only after a rotation of the belt spool 12 through 360 degrees.

Figure 29:
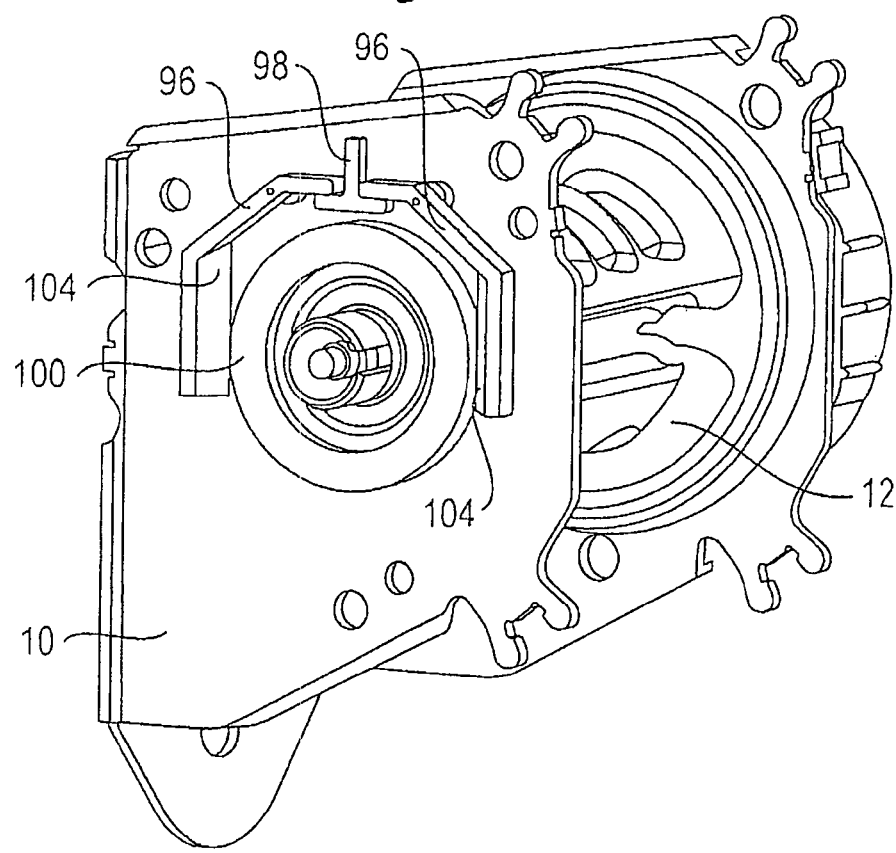
FIG. 29 shows a perspective view of the belt retractor according to FIGS. 27 and 28, with the force limiter in a force limiting position.
Figure 30:
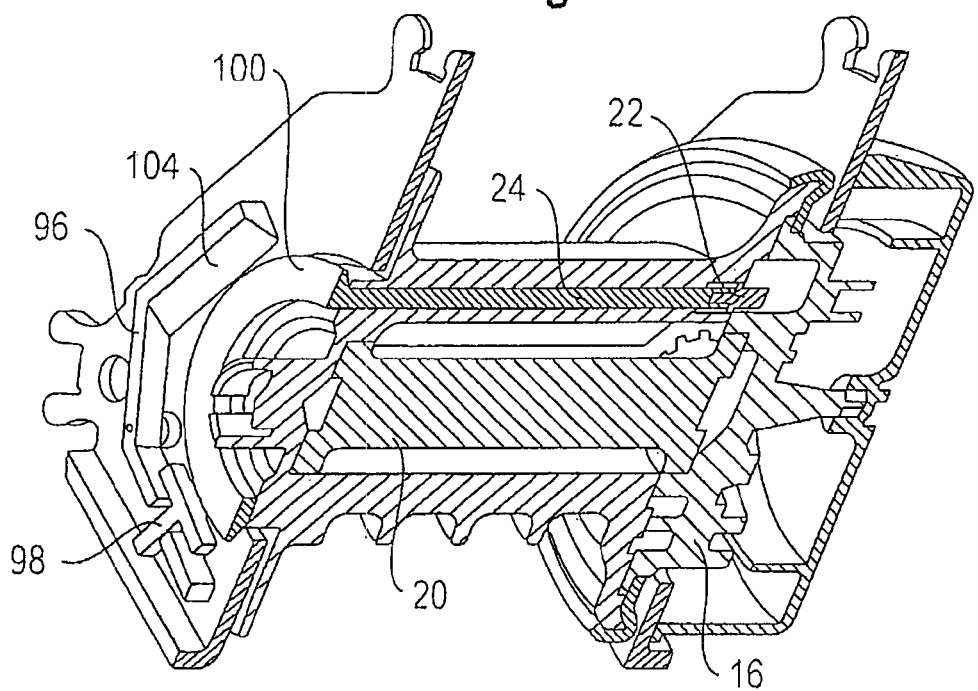
FIG. 30 shows a perspective sectional view of the belt retractor according to FIGS. 27 to 29, with the force limiter in a force limiting position.

FIGS. 27 to 30 show a tenth embodiment of the belt retractor, with the cutting body 22 being in its initial position in FIGS. 27 and 28 and in the force limiting position in FIGS. 29 and 30. The transmission gearing or planetary gear is not shown in this embodiment, but reference is made to the discussions above.

After a particular length of belt webbing has been withdrawn, the transmission or planetary gear not shown engages a T-shaped actuating member 98 and shifts it radially towards the belt spool 12. In the process, two levers 96 are moved away from an annular section 100 of the control pin 24 so that they no longer engage the control pin 24, and the control pin 24 and the cutting body 22 fitted thereto are urged into the force limiting position, i.e. towards the disk 16, by a spring-elastic member 102 (FIG. 28).

Upon a relative rotation between the belt spool 12 and the disk 16, material of the disk 16 is cut by the cutting body 22 in the force limiting position.

Again, where a smaller or thinner vehicle occupant is involved, the cutting body 22 is not moved into the force limiting position by the control projection (not shown) until after a rotation of the belt spool 12 through 360 degrees.

In order that the control pin 24 is shifted more easily, the levers 96 are each provided with an inclined plane 104.

Figure 31:
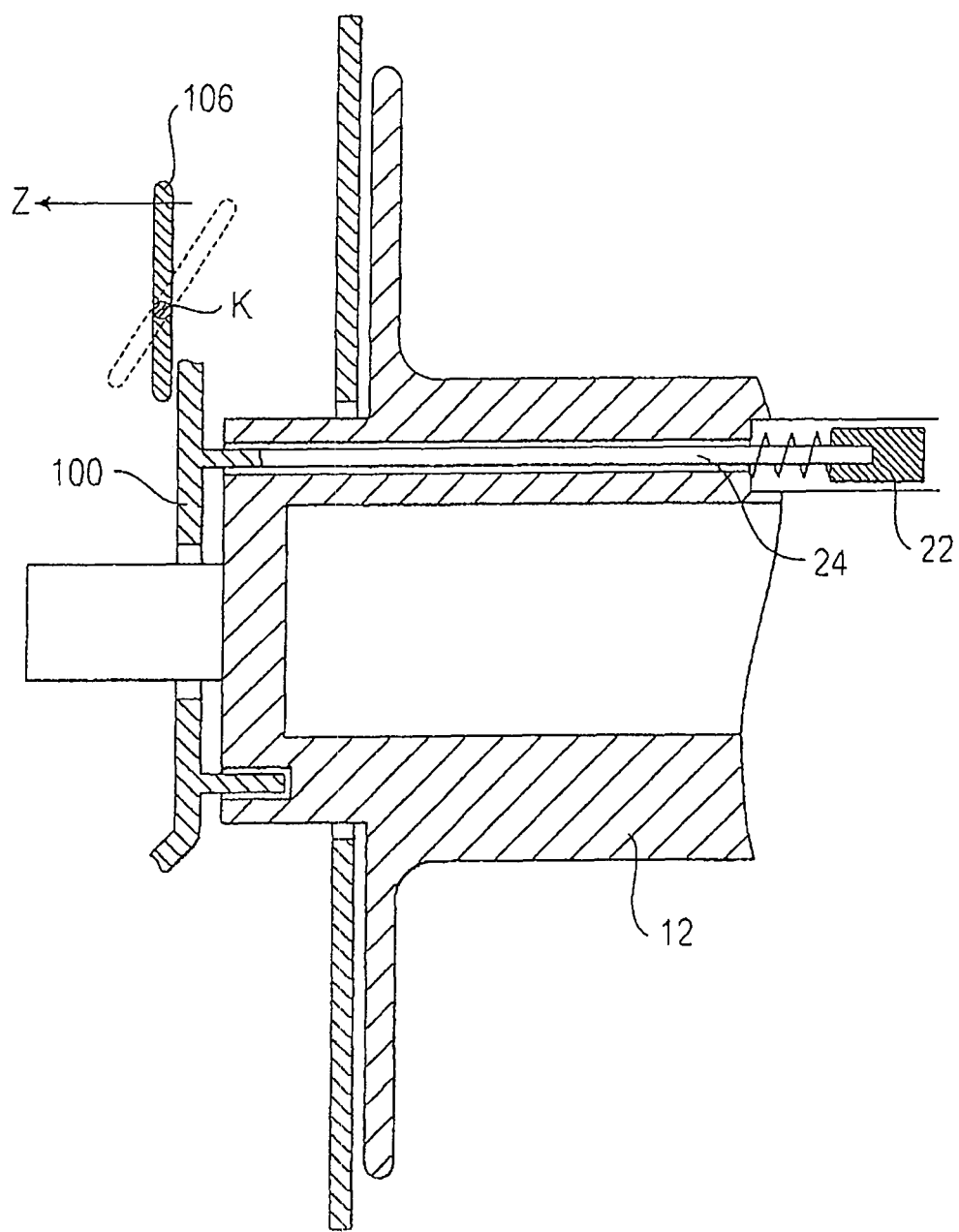
FIG. 31 shows a partly sectional view of a part of a belt retractor according to an eleventh embodiment of the invention, with the force limiter in a force limiting position.

FIG. 31 shows an eleventh embodiment of the belt retractor. The transmission gearing or planetary gear is not shown in this embodiment; reference is however made to the discussions above.

After a particular belt webbing withdrawal, the transmission or planetary gear pulls on a lever 106 (cf. arrow Z in FIG. 31) that is adapted to be tilted about a point K, as a result of which the annular section 100 of the control pin 24 is moved axially towards the belt spool 12 and the cutting body 22 is shifted into its force limiting position. The lever 106 is shown in dashed lines in the position in which it holds the cutting body 22 in the force limiting position.

Again, where a smaller or thinner vehicle occupant is involved, the cutting body 22 is not moved into the force limiting position by the control projection (not shown) until after a rotation of the belt spool 12 through 360 degrees.

Figure 32:
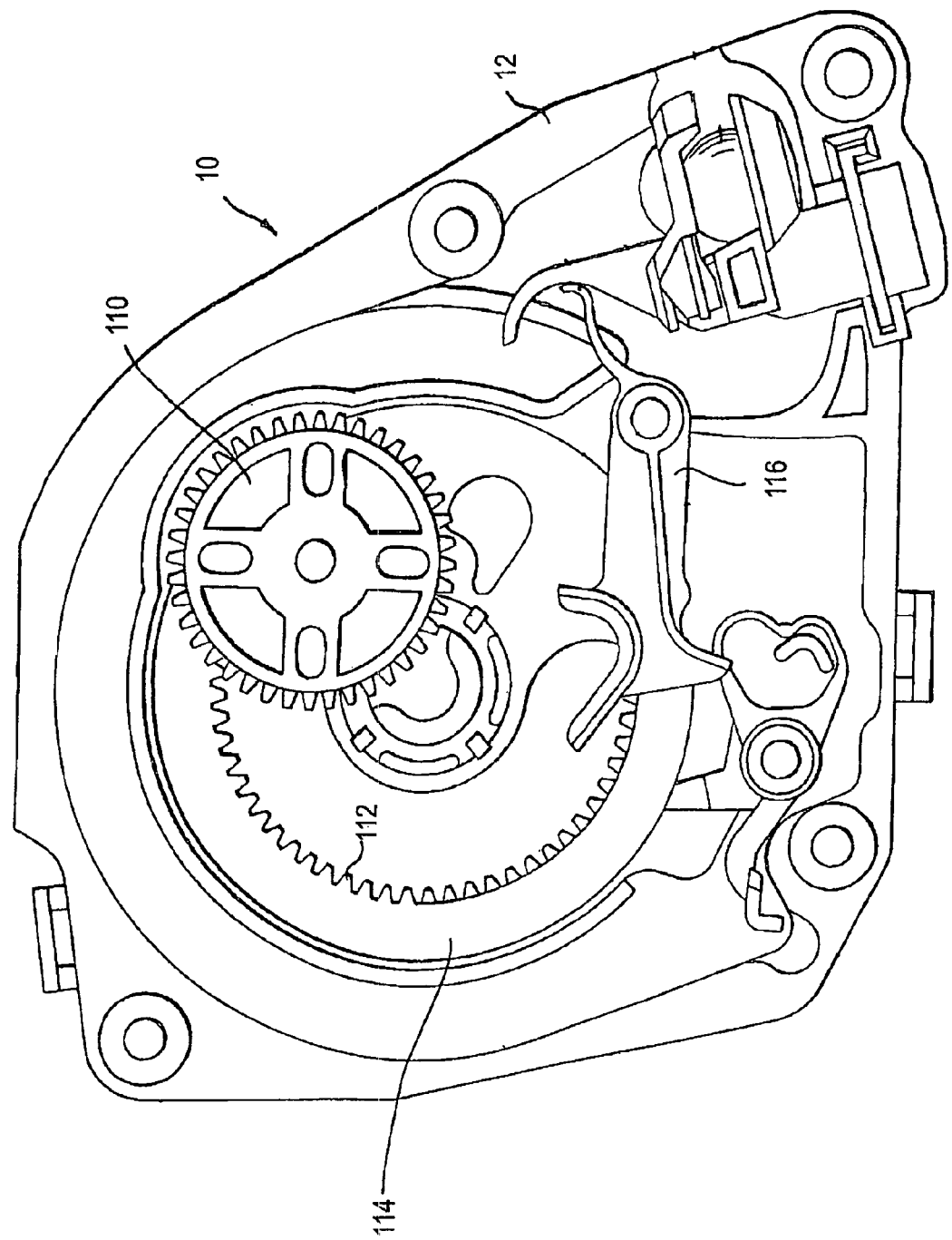
FIG. 32 shows a diagrammatic side view of part of a belt retractor according to a twelfth embodiment of the invention, with a reduction gear.
Figure 33:
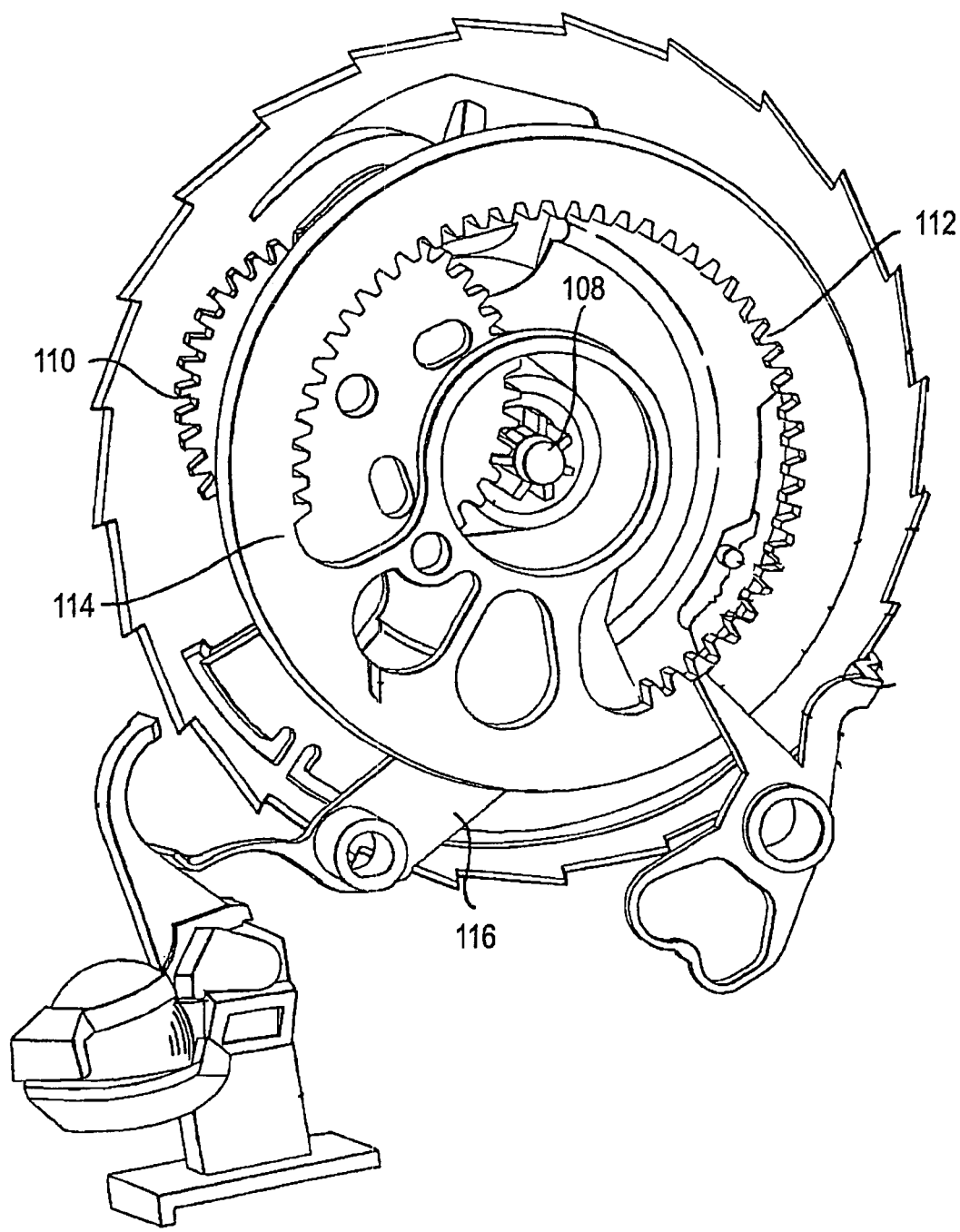
FIG. 33 shows a perspective side view of the reduction gear of the belt retractor of FIG. 32.
Figure 34:
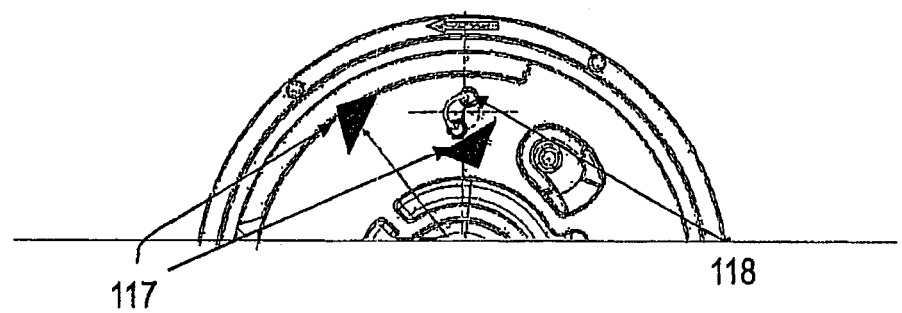
FIG. 34 diagrammatically shows part of the reduction gear of FIGS. 32 and 33 and a rotatable switching rocker which may shift a force limiter into its force limiting position.
Figure 35:
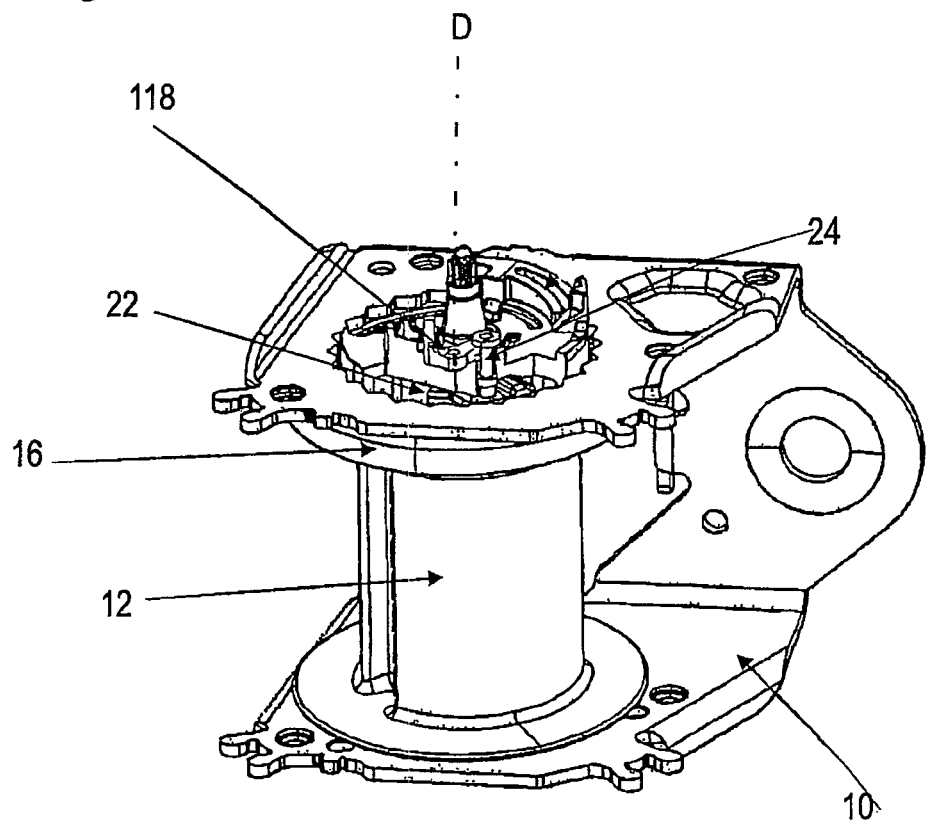
FIG. 35 shows a perspective view of the part of the belt retractor of FIGS. 32 and 33 which is diagrammatically shown in FIG. 34.

FIGS. 32 to 36 show a twelfth embodiment of the belt retractor, FIGS. 32 to 33 showing a reduction gear which is disclosed and described in detail in DE 103 60 032 A1, which corresponds with U.S. Patent Publication No. 2005/0133652, the entirety of which are incorporated by reference herein in their entirety.

The reduction gear includes a pinion 108 formed on the belt spool 12, a reduction gearwheel 110 which is mounted stationarily with respect to the frame 10 of the belt retractor, and internal teeth 112 which are provided on a locking disk 114 and extend through approximately 270 degrees. The gear reduction reduces the rotation of the belt spool 12 and may move a locking lever 116 as described in DE 103 60 032 A1.

Figure 36:
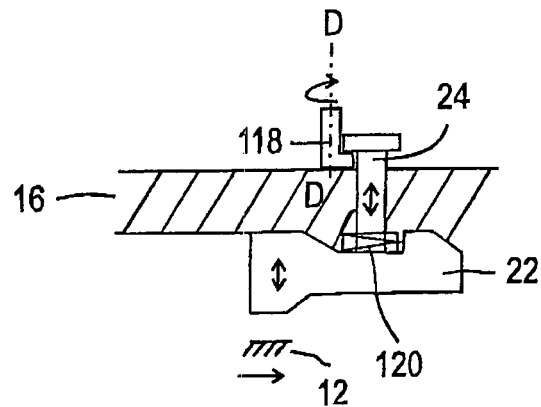
FIG. 36 shows a diagrammatic sectional view of the belt retractor of FIG. 35, with the force limiter in an initial position.

In the following, the locking lever 116 disclosed in DE 103 60 032 A1 is called switching fork 117. The switching fork 117 may rotate a switching rocker 118 about a rotation axis D as a result of which the latter releases a control pin 24 which has a cutting body 22 fitted thereto. The control pin 24 is pushed towards the belt spool 12 by a spring-elastic member 120 (FIG. 36). The cutting body 22 is then in its force limiting position.

Upon a relative rotation between the belt spool 12 and the disk 16, material of the belt spool 12 is cut by the cutting body 22 in the force limiting position.

Again, where a smaller or thinner vehicle occupant is involved, the cutting body 22 is not moved into the force limiting position by the control projection (not shown) until after a rotation of the belt spool 12 through 360 degrees.

The movement of the switching rocker 118 takes place at a desired switching point which is initiated depending on the required withdrawal of belt webbing. The movement of the switching rocker 118 may just as well occur at a switching point which is initiated depending on the number of rotations about the axis and/or on further mechanical or electrical driving sources.

FIGS. 37 to 40 show further variants how the rotational movement of the switching rocker 118 is converted into an axial movement of the cutting body 22 after a determined withdrawal of belt webbing.

Figure 37:
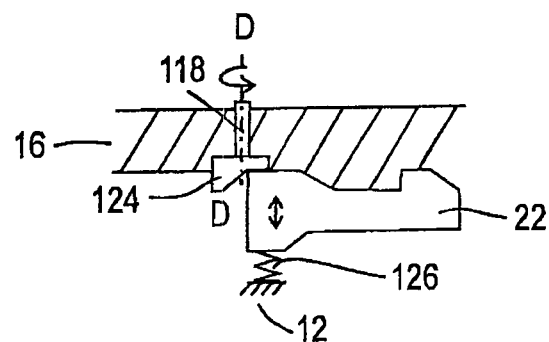
FIG. 37 shows a view corresponding to FIG. 36, with part of the guide-in mechanism which could alternatively be used in the belt retractor shown in FIG. 35.

In FIG. 37, an eccentric body 124 is fixed to the rotatable switching rocker 118. The eccentric body 124 engages the cutting body 22 and pushes it downwards with respect to FIG. 37, contrary to the force of a spring-elastic member 126 when the switching rocker 118 is rotated. The cutting body 22 is then in its force limiting position.

When the cutting body 22 is in the force limiting position and a relative rotation occurs between the disk 16 and the belt spool 12, the cutting body 22 cuts material of the belt spool 12.

With a smaller or thinner vehicle occupant, after the disk 16 is blocked and while the belt spool 12 rotates relative to the disk 16, the cutting body 22 is shifted towards the belt spool 12 by the control projection at the latest.

Though FIG. 37 does not show a control pin 24, this pin could just as well be provided between the eccentric body 124 and the switching rocker 118.

Figure 38:
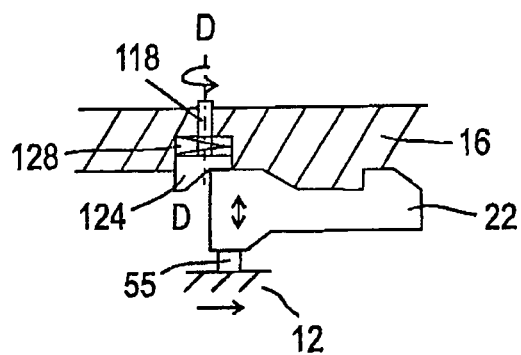
FIG. 38 shows a view corresponding to FIG. 36, with part of the guide-in mechanism which could alternatively be used in the belt retractor shown in FIG. 35.

The variant shown in FIG. 38 differs from the variant shown in FIG. 37 in that the cutting body 22 rests on projections 55 of the belt spool 12. The eccentric body 124 is rotated along with the switching rocker 118. Since the eccentric body 124 rests on the cutting body 22 which is not displaceable, it is pushed upwards (with respect to FIG. 38), contrary to the force of a spring-elastic member 128. In the process the spring-elastic member 128 is biased.

As soon as a relative rotation takes place between the belt spool 12 and the disk 16, that is, a movement of the belt spool 12 in the belt webbing withdrawal direction (cf. arrow in FIG. 38), the projections 55 are pulled away from under the cutting body 22. The biased spring-elastic member 128 which engages the cutting body 22 and rests against the disk 16, urges the cutting body 22 towards the belt spool 12. The cutting body 22 is then in its force limiting position.

If there is no rotation of the belt spool 12 relative to the disk 16, the projections 55 are not pulled away from under the cutting body 22 so that the latter can not be shifted towards the belt spool 12 by the spring-elastic member 128.

Where a smaller or thinner vehicle occupant is involved, the cutting body 22 is moved into the force limiting position by a known control projection (not shown).

Figure 39:
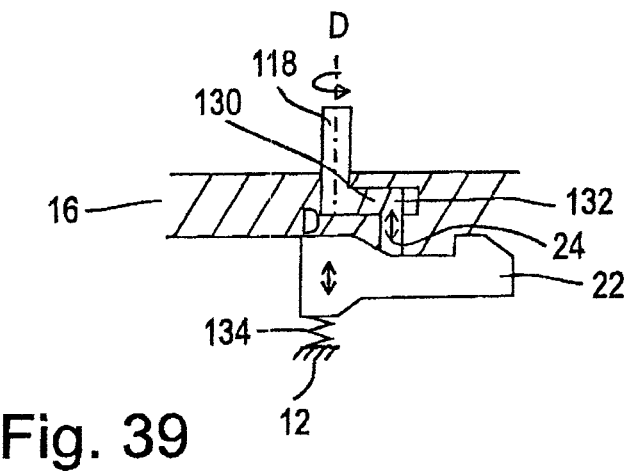
FIG. 39 shows a view corresponding to FIG. 36, with part of the guide-in mechanism which could alternatively be used in the belt retractor shown in FIG. 35.

The variant shown in FIG. 39 differs from the variant shown in FIG. 37 in that the switching rocker 118 is essentially L-shaped and has an inclined plane 130 which may cooperate with an inclined plane 132 of the control pin 24 and may displace the latter, along with the cutting body 22, contrary to the force of a spring-elastic member 134.

Figure 40:
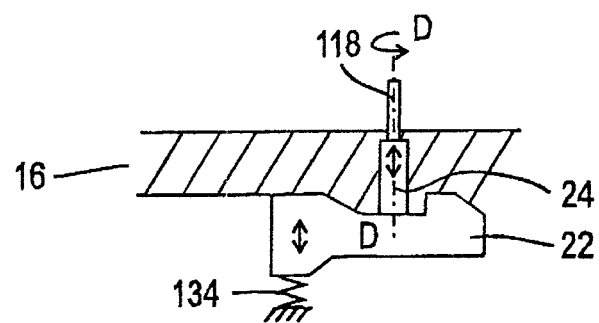
FIG. 40 shows a view corresponding to FIG. 36, with part of the guide-in mechanism which could alternatively be used in the belt retractor shown in FIG. 35.

In the variant shown in FIG. 40, the rotational movement of the switching rocker 118 can be converted into an axial movement of the control pin 24. For this purpose, the face of the switching rocker 118 facing the control pin 24 is formed for example in a helical manner, and the face of the control pin 24 (not shown) is formed correspondingly. As a result, a rotational movement of the switching rocker 118 may lead to an axial displacement of the control pin 24, and the cutting body 22 may reach the force limiting position.

Figure 41:
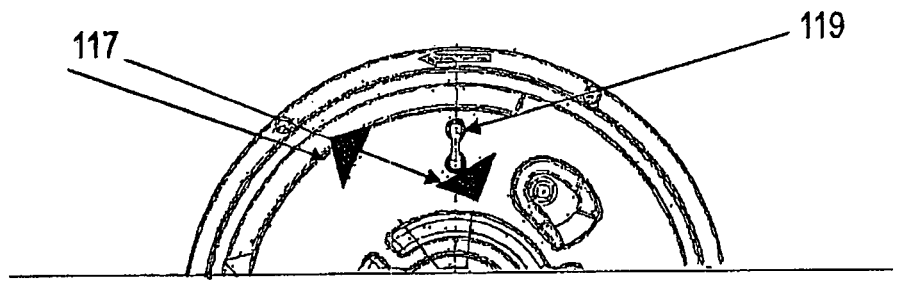
FIG. 41 diagrammatically shows part of the reduction gear of FIGS. 32 and 33 and a switching lever which can be shifted translationally and may shift a force limiter into its force limiting position.
Figure 42:
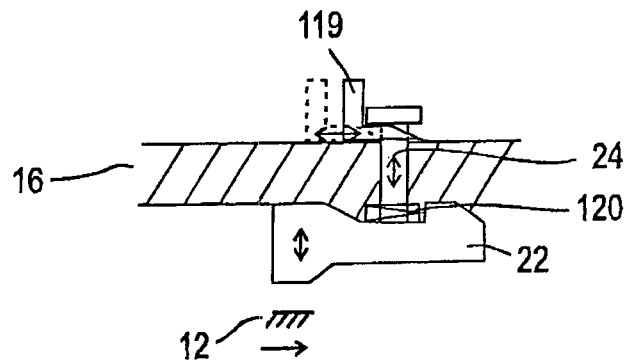
FIG. 42 shows a diagrammatic sectional view of the belt retractor of FIG. 41, with the force limiter in an initial position.
Figure 43:
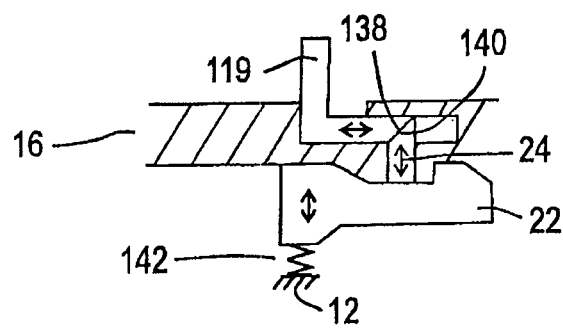
FIG. 43 shows a view corresponding to FIG. 42, with part of the guide-in mechanism which could alternatively be used in the belt retractor diagrammatically shown in FIG. 41.

FIG. 41 diagrammatically shows part of a belt retractor with the switching fork 117 which can shift a switching lever 119 translationally. Here, the shifting of the switching fork 117 occurs by means of the reduction gear which is shown in FIGS. 32 and 33 and to which reference is made. FIGS. 42 and 43 show two possibilities how the translational movement of the switching lever 119 can be converted into an axial movement of the cutting body 22.

The variant shown in FIG. 42 differs from FIG. 36 in that the switching lever 119 may be shifted translationally away from control pin 24. The control pin 24 is thus released. The spring-elastic member 120 can then push the cutting body 22 towards the belt spool 12.

The variant shown in FIG. 43 differs from FIG. 42 in that the switching lever 119 which can be moved translationally is L-shaped and has an inclined plane 138. The switching lever 119 shifts the control pin 24, which has a corresponding inclined plane 140, axially contrary to the force of a spring-elastic member 142.

The invention claimed is:

1. A belt retractor comprising:
a frame (10),
a belt spool (12) that extends along an axis and is rotatably mounted in said frame (10),
a force limiter (22) that switches from an initial position into a force limiting position prior to a vehicle crash, said force limiter (22) switching from the initial position to the force limiting position by moving relative to said belt spool (12) only in a direction substantially parallel to said axis of said belt spool (12),
a lock disk (16) having a first condition rotatable with the belt spool (12) relative to the frame (10) and a second condition in which the lock disk (16) is blocked from rotation relative to the frame (10) and the belt spool (12) rotates relative to the lock disk (16) and the frame (10),
a control pin (24) connected to said force limiter (22) and moving axially relative to said belt spool (12) to move said force limiter (22) from the initial position to the force limiting position, and
a guide-in mechanism being provided which selectively engages and disengages entirely from the control pin (24) when the lock disk (16) is in the first condition to allow said force limiter (22) to reach said force limiting position prior to a vehicle crash based on a defined length of belt webbing withdrawn from a fully wound belt.

2. The belt retractor according to claim 1, wherein said force limiter is a cutting body (22) that cuts material in said force limiting position.

3. The belt retractor according to claim 1, wherein the guide-in mechanism includes a gearwheel (30) provided on said frame (10).

4. The belt retractor according to claim 3, wherein the guide-in mechanism includes a projection (28) formed as part of said belt spool (12), said projection (28) meshing with said gearwheel (30).

5. The belt retractor according to claim 3, wherein the guide-in mechanism includes a lever (34) mounted at said belt spool (12) and selectively engageable with the control pin (24).

6. The belt retractor according to claim 5, wherein the gearwheel (30) includes a longer tooth (32) which can actuate said lever (34).

7. The belt retractor according to claim 3, wherein a spring-elastic member (36) is provided that urges said control pin (24) into an initial position.

8. The belt retractor according to claim 1, wherein the guide-in mechanism includes an intermediate disk (78) that is axially displaceable relative to the control pin (24).

9. The belt retractor according to claim 8, wherein the guide-in mechanism includes a planetary gear having a ring gear (72) and a planet wheel (70).

10. The belt retractor according to claim 9, wherein the guide-in mechanism includes a coupling disk (86) coupled to said ring gear (72).

11. The belt retractor according to claim 10, wherein balls (92) are arranged between said coupling disk (86) and said intermediate disk (78).

12. The belt retractor according to claim 11, wherein said intermediate disk (78) includes at least one section having an inclined plane (94) along which the balls (92) travel.

13. The belt retractor according to claim 9, wherein the guide-in mechanism includes at least one lever (96) adapted to engage said control pin (24).

14. The belt retractor according to claim 13, wherein said at least one lever (96) includes an inclined plane (104).

15. The belt retractor according to claim 9, wherein the guide-in mechanism includes a lever (106).

16. The belt retractor according to claim 8, wherein the ring gear (72) includes an elevated portion (74) and the intermediate disk (78) has an elevated portion (76) that is adapted for alignment with said elevated portion (74) of said ring gear (72).

17. The belt retractor according to claim 8, wherein the guide-in mechanism includes a magnet (80) and an iron core (82), said ring gear (72) including said magnet (80) and said intermediate disk (78) including said iron core (82).

18. The belt retractor according to claim 17, wherein an inclined plane (84) is provided on said frame (10).

19. The belt retractor according to claim 1, wherein the guide-in mechanism includes a reduction mechanism having a reduction gearwheel (110) and a switching fork (117).

20. The belt retractor according to claim 19, wherein the guide-in mechanism includes a switching rocker (118) which is shifted rotationally by said switching fork (117).

21. The belt retractor according to claim 19, wherein the guide-in mechanism includes a switching lever (119) which is shifted translationally by said switching fork (117).

22. The belt retractor according to claim 1 wherein the guide-in mechanism (26) causes the force limiter (22) to reach the force limiting position in response to multiple revolutions of the belt spool (12).

23. The belt retractor according to claim 1, wherein the force limiter (22) switches from the initial position to the force limiting position by moving relative to the lock disk (16) only in a direction substantially parallel to the axis of the belt spool (12).

24. The belt retractor according to claim 1, wherein the initial position of the force limiter is a non-force limiting position.

25. The belt retractor according to claim 1, wherein the force limiter is spaced from an axial end face of the belt spool when in the initial position and extends beyond the axial end face of the belt spool when in the force limiting position.

26. The belt retractor according to claim 1, wherein the force limiter switches from the initial position to the force limiting position prior to sensing a vehicle crash based on a defined length of belt webbing withdrawn from a fully wound belt.

27. The belt retractor according to claim 1, wherein the control pin rotates with the belt spool and extends along a longitudinal centerline that is parallel to the axis of the belt spool.

28. A belt retractor comprising:
a frame (10),
a belt spool (12) that extends along an axis and is rotatably mounted in the frame (10),
a force limiter (22) that switches from an initial position into a force limiting position prior to a vehicle crash by moving relative to the belt spool (12) only in a direction substantially parallel to the axis of the belt spool (12), and
a guide-in mechanism having a first portion rotatably mounted on the frame and a second portion movable relative to the force limiter (22) to allow the force limiter (22) to reach the force limiting position prior to a vehicle crash, the first portion rotating to act on the second portion by moving the second portion out of engagement with the force limiter (22) to allow the force limiter (22) to reach the force limiting position based on a defined length of belt webbing withdrawn from a fully wound belt.

29. The belt retractor according to claim 28, wherein the first portion is rotatably mounted on the frame about an axis extending parallel to the axis of the belt spool (12).

* * * * *